US006475539B1

(12) United States Patent
DeWille et al.

(10) Patent No.: US 6,475,539 B1
(45) Date of Patent: *Nov. 5, 2002

(54) NUTRITIONALLY COMPLETE LOW PH ENTERAL FORMULA

(75) Inventors: Normanella T. DeWille, Upper Arlington, OH (US); Jeffrey G. Morris, Brockville (CA); Terrence B. Mazer, Reynoldsburg, OH (US); Paul S. Anloague, Reynoldsburg, OH (US); Amanda L. Smeller, Loveland, OH (US); Michael A. Chandler, Westerville, OH (US); Diane M. Garcia, Westerville, OH (US); Louis I. Ndife, Columbus, OH (US)

(73) Assignee: Abbott Laboratories, Abbott Park, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/293,411

(22) Filed: Apr. 16, 1999

Related U.S. Application Data

(63) Continuation-in-part of application No. 09/074,526, filed on May 7, 1998, now abandoned.

(51) Int. Cl.⁷ .......................... A23B 4/12; A23L 1/302; A23L 1/304; A23L 1/0524
(52) U.S. Cl. ......................... 426/72; 426/74; 426/573; 426/577; 426/580; 426/583
(58) Field of Search ................ 426/801, 573, 426/577, 72, 74, 11, 580

(56) References Cited

U.S. PATENT DOCUMENTS

| 3,692,532 A | 9/1972 | Shenkenberg et al. |
| 4,078,092 A | 3/1978 | Nishiyama |
| 4,212,893 A | 7/1980 | Takahata |
| 4,309,417 A | 1/1982 | Staples |
| 4,931,300 A | 6/1990 | Monte |
| 5,141,758 A | 8/1992 | Monte |
| 5,156,875 A | 10/1992 | Monte |
| 5,234,702 A | 8/1993 | Katz et al. |
| 5,389,391 A | 2/1995 | Monte ........................ 426/532 |
| 5,409,725 A | 4/1995 | Connolly ..................... 426/599 |
| 5,614,241 A | 3/1997 | Monte ......................... 426/532 |
| 5,641,531 A | 6/1997 | Liebrecht et al. |
| 5,690,975 A | * 11/1997 | Akahoshi et al. ........... 426/577 |
| 5,700,513 A | * 12/1997 | Mulchandani et al. ....... 426/573 |

FOREIGN PATENT DOCUMENTS

| EP | 0 486 425 A2 | 10/1991 |
| EP | 0 765 609 | 9/1996 |
| EP | 0 639 335 | 6/1998 |
| GB | 1440161 | 1/1974 |
| WO | WO 96 29880 | 3/1996 |
| WO | WO 96 25054 | 8/1996 |
| WO | WO 96/29880 | 10/1996 |

OTHER PUBLICATIONS

Refreshing Dairy Beverages, Copenhagen Pectin A/S, A Division of Hercules Incorporated. copyright Copenhagen Pectin A/S 1998 Brochure.
Pederson, et al., "Influence of pectin on the stability of casein solutions studied in dependence of varying pH and salt concentration," Food Hydrocolloids, vol. 5, No. 4, pp. 323–328, 1991.
A.C. Spork, Acidifying Dairy–Based Drinks, Dairy Foods, Jul., 1994, pp. 34–36.
Ledward, D.A., "Protein–Polysaccharide Interactions," vol. 13, Polysaccharides in Food, School of Agriculture, University of Nottingham, pp. 205–217.
Thakur, B., et al., Critical Reviews in Food Science and Nutrition, 37(1):47–73, 1997.
McCue, N., *R & D Applications, Juice With Milk Has Family Appear*, Prepared Foods, Sep. 1994, p. 87.
Pediasure®, Complete Liquid Nutrition for children 1–10 years, Ross Medical Nutritional Products Handbook, 1998.
Ensure®, Complete, Balanced Nutrrition®, Ross Medical Nutritional Products Handbook, 1998.

* cited by examiner

Primary Examiner—Helen Pratt
(74) Attorney, Agent, or Firm—Nickki L. Parlet; J Michael Dixon

(57) ABSTRACT

This invention is directed to a low pH nutritional formula that contains high levels of macronutrients, vitamins and minerals. The pH of the enteral formula is from about 3.0–4.6 and delivers at least 25% of the RDI for selected vitamins and minerals in a 237 ml. serving. The enteral formula uses a stabilizing system comprising high methoxy pectin to stabilize the protein and a unique process to produce the formula.

9 Claims, No Drawings

NUTRITIONALLY COMPLETE LOW PH ENTERAL FORMULA

CROSS REFERENCE

This application is a continuation-in-part of U.S. patent application Ser. No. 09/074,526 which was filed on May 7, 1998, now abandoned.

TECHNICAL FIELD

This invention relates to a low pH enteral formula that contains high levels of macronutrients, vitamins and minerals. The inventive formula possesses excellent physical stability and taste. The inventive formula also exhibits a shelf life of at least one year in a liquid state with minimal or no sedimentation. The formula of this invention utilizes a unique stabilizing system, antioxidant system and method of production to produce a physically stable, low pH nutritional beverage that contains high levels of protein and delivers at least 25% of the Reference Daily Intake (RDI) for selected vitamins and minerals in approximately a 250 ml serving. The formula can be adjusted to meet the nutritional needs of adults and children over 4 years age or to children under 4 years of age.

BACKGROUND OF THE INVENTION

Nutritionally complete, balanced, isotonic enteral formula have been known for some time. These formula are designed to be used as the sole source of nutrition for a patient or as a supplement. Typically, these liquid products are designed to provide approximately 100% of the patient's nutritional needs in about 1,000 ml. These formula may also be designed to be disease specific in that they fulfill the special nutritional requirements of patients afflicted with conditions such as glucose intolerance, pulmonary disease or those who have been subjected to surgery or trauma. These nutritionally complete formula are known by the artisan to be prone to physical stability problems such as syneresis and the formation of non-dispersible sediments. These problems are caused by the high level of protein, fats and minerals that these nutritional formula must contain to provide adequate nutrition in a reasonable volume.

Most nutritionally complete enteral formula have a neutral pH and have flavors that are limited to the traditional "milkshake" types. Acidified or low pH nutritionals offer several advantages in that the possibility of microbial contamination can be reduced and a variety of refreshing fruit flavors can be used. However, acidification of the traditional enteral formula leads to protein precipitation, phase separation and the formation of non-dispersible sediments. These problems result in the product being aesthetically unacceptable to the patient and the formula may fail to deliver adequate nutrition due to the formation of the non-dispersible sediments.

PediaSure®, complete liquid nutrition, is manufactured by the Ross Products Division of Abbott laboratories (Columbus, Ohio) and is designed to be a nutritionally complete, balanced, isotonic enteral formula especially designed for tube or oral feeding of children 1 to 10 years of age. This product is used as a sole source of nutrition or as a supplement and meets or exceeds 100% of the U.S. RDI's for protein, vitamins and minerals for children 1–6 years of age in 1000 mL and for children 7–10 years of age in 1300 mL. PediaSure contains 1.0 calorie per mL and has a caloric distribution of 12.0% protein, 44.8% fat and 43.9% carbohydrate. This product has a pH of about 7.0 and is available in a variety of "milk shake" flavors. This product is not intended for infants under 1 year of age.

Ensures®, complete, balanced nutrition, is manufactured and distributed by the Ross Products Division of Abbott Laboratories for adult consumption. This formula contains 1.06 calories per mL and has a caloric distribution of 14% from protein, 31.5% from fat and 54.5% from carbohydrate. The formula meets or surpasses 100% of the U.S. RDI for vitamins and minerals for adults and children 4 or more years of age in 2000 calories (two quarts or 1.892 L). Ensure is available in numerous milk shake type flavors. It is also available in high nitrogen, high calorie as well as with dietary fiber. While PediaSure® and Ensure® nutritional products have been accepted by the public and health care providers, a need exists to present the patient with flavor alternatives that will increase patient enjoyment and thereby compliance.

Numerous investigators have reported on various approaches to overcome the problems associated with low pH formula. U.S. Pat. No. 5,409,725 to Connolly discloses a process for stabilizing protein in an acidic media through a chemical reaction between the protein and galactomannan to produce a glycoprotein. The galactomannan used by Connolly is a linear polysaccharide, such as locust bean gum (LBG) and guar gum. This patent also discloses the optional use of a heat stability agent such as pectin or high methoxy pectin. This reference provides one example of a low pH (2.0–6.0), milk based beverage that was not fortified with the levels of calcium and protein required for a nutritionally complete beverage. As will be demonstrated in the comparative examples herein, the stabilization system of U.S. Pat. No. 5,409,725 is not effective in a low pH nutritional matrix that contains high levels of protein and macronutrients.

U.S. Pat. No. 3,692,532 to Shenkenberg, et al., discloses a stable milk-fruit juice beverage consisting essentially of milk, fruit juice, sweetener and sodium carboxymethylcellulose (NaCMC) wherein the beverage has a viscosity of less than 30 cp and is stable at pH levels below 5.0. This patent teaches that sufficient time be allowed for the carboxyl groups of the carboxymethylcellulose (CMC) to react with the casein molecules to form a complex which results in a stable, free flowing, non-congealing, low-viscosity beverage.

U.K. Patent 1,440,161 to Nishiyama teaches a milk-fruit juice beverage which contains 4.2–6.2 w/v % of NaCMC as a stabilizer to prevent the coagulation of milk protein, 10–50 w/v % of a fruit juice and 3.1–5.0 w/v % of citric, lactic, malic or tartaric acid. In the process of Nishiyama, the NaCMC is added to hot water with vigorous agitation at neutral pH and then the juice is added. After cooling, the solution is acidified with the recited food grade acid. No additional protein, fat, carbohydrates, minerals and/or vitamins are added to the beverage. In a related case, U.S. Pat. No. 4,078,092, Nishiyama discloses a milk-apple juice drink having a pH of 3.6–4.5 wherein 100 ml of the drink contains 4.2–6.0 gms of a carboxylic acid.

Pedersen, et al., in an article entitled: "Influence of pectin on the stability of casein solutions studied in dependence of varying pH and salt concentration", *Food Hydrocolloids*, Vol. 5, No. 4, pp. 323–328, (1991), discusses pectin-casein interactions and teaches that the addition of pectin to casein solutions lowers the pH value at which the casein precipitates. The effect was studied in the presence of various salts and polysaccharides and concluded that the stabilization of pectin-casein systems is primarily of an electrostatic nature.

U.S. Pat. No. 4,212,893 to Takahata discloses a stable, emulsified, acidified whole milk beverage made by: (1) preparing an aqueous solution of LBG and adding it to whole milk at a concentration to result in 0.3% by weight LBG based on the total weight of the beverage; (2) acidifying the milk emulsion with fruit juice or organic acids to a pH of between 3.4 and 3.6; (3) stabilizing the emulsion by stirring the acidified mixture for 10–30 minutes; (4) homogenizing the acidified emulsion; and (5) sterilizing and packaging the acidified emulsion.

EP 0 486 425 A2 to Kvamme relates to a nutritional formulation containing from 40–90% of the calories from carbohydrates, from 2–30% of the calories from protein, from 0–35% of the calories from fat and from 0–17% of the calories from fiber. The protein source is at least 60% by weight whey protein concentrate and the pH of the formulation is 3.5–3.9. This reference discloses the use of polyglycerol esters and hydrolyzed guar gum as an emulsification system for the nutritional product containing fat and fiber.

U.S. Pat. Nos. 4,931,300; 5,156,875; 5,141,758; and 5,389,391 to Monte disclose various low pH, antimicrobial food compositions. These foods are powdered compositions that may later be reconstituted with liquids. The Monte compositions usually comprise a protein component, a fat component and a carbohydrate component. Monte also teaches the use of emulsifiers and antimicrobial agents such as sorbate and benzoate's. The U.S. Pat. No. 5,156,875 specifically discloses the use of a binary stabilizer system which comprises a modified starch such as modified potato starch and a cellulose gum. In one example, Monte replaces his stabilizing system with pectin. He reports that in less than six (6) hours, particulate began settling and separating out of the pectin stabilized solution to form a layer of material at the bottom of the beaker. Monte suggests that pectin is inappropriate for low pH food compositions. In U.S. Pat. No. 5,389,391, Monte teaches and discloses a low pH protein stabilizer system comprising a pectin substance and methyl cellulose. Monte teaches that this low pH protein stabilizer system is from 0.1–20% by dry weight pectin, or another pectin substance, in combination with 0.001–10.0% by dry weight of NaCMC or another methyl cellulose. The Monte patents fail to suggest a method of producing a low pH beverage that contains at least 100% of the daily nutritional needs of an adult for calcium, vitamin D, vitamin C, vitamin K and vitamin E in approximately 1000 ml (a single serving of approximately 250 ml provides 25%). Monte also specifies that once the product is reconstituted, it has a shelf life of several days.

U.S. Pat. No. 5,614,241 to Monte discloses a nutritionally balanced, water soluble, powdered food composition which, when mixed with water, has a low pH and high antimicrobial activity. This patent discloses the use of 1–5% by weight of a pectin substance for preventing the precipitation of protein. This patent also teaches the use of a buffer system for the low pH drink which comprises sodium citrate and citric acid. The preferred pH of this beverage is less than about 4.75 and under the most preferred conditions is less than about 4.5. This patent does not address the special problems and parameters of a low pH enteral formula that contain high levels of macronutrients, vitamins and minerals. Further, it is known that nutritional powders experience phase separation problems upon reconstitution. The patent specifies that the reconstituted product has a shelf life of several days.

PCT/US96/02245 (WO 96/29880) to Yang, et al., discloses a product which contains from 5 to about 99.8% milk, from about 0.05 to about 0.8% of a food stabilizer and a food acid. This application specifically teaches the acidification of the mixture while the particle size of the protein/stabilizer particles is less than about 0.8 microns. This reference teaches that various food stabilizers can be employed, such as gum arabic, gelatin, xanthan, locust bean and pectin. A blend of pectin and CMC is specifically disclosed in this reference. This reference does not address the special needs of nutritional products having high levels of protein and nutrients such as calcium.

U.S. Pat. No. 5,641,531 to Liebrecht, et al., relates to a substantially clear liquid nutritional supplemental that comprises 1–10% by weight whey protein isolate, at least one source of carbohydrate having a DE of at least 10, vitamins, trace minerals and ultra trace minerals. The pH of the Liebrecht, et al., beverage is from 2.8 to about 3.3, has a caloric density of at least 1.0 kcal/ml and uses no stabilizing system. This patent is not concerned with nutritionally complete beverages as it discloses a beverage that is essentially devoid of added macronutrients and fat.

U.S. Pat. No. 5,234,702 to Katz, et al., relates to an antioxidant system for powdered nutritional products. The powdered nutritional products contain an unsaturated lipid component which is stabilized by a mixture of ascorbyl palmitate, β-carotene and citrate. This patent does not suggest the use of the antioxidant system for use in a low pH beverage that contains high levels of protein and macronutrients.

Hercules Food Ingredients, Wilmington, Del., supplies a pectin-type ingredient that is taught to stabilize a juice/milk mixture. GENU® (registered trademark of A/S Pektinfabrik of Copenhagen, Denmark) pectin-type JM is known to control stability and control viscosity of sour milk drinks. A description of the use of GENU® pectin in a beverage can be found in McCue, N. (Sr. ed.) Prepared Foods, September 1994, page 87. The use of high methoxyl pectin in dairy/juice products is disclosed by A. C. Spork in "Acidifying Dairy-Based Drinks", *Dairy Foods*, July, 1994, pages 34–36. Neither of these references address the problems associated with a low pH beverage that contains high levels of protein and macronutrients.

The ability of acidic polysaccharides such as CMC to inhibit protein precipitation at the isoelectric point of the proteins has been used in the preparation of fruit-flavored milk drinks. CMC has been found particularly effective in keeping milk proteins in solution. For a review of protein-polysaccharide interactions, see D. A. Ledward, "Protein-Polysaccharide Interactions", Vol. 13, *Polysaccharides in Food*, School of Agriculture, University of Nottingham, pages 205–217.

Thakus, et al., in *Critical Reviews in Food Science and Nutrition*, 37(1):47–73 (1997) provide a review of the chemistry and uses of pectin. This publication does not address the special problems associated with low pH and viscosity milk/juice beverage that provides complete nutrition to a human in about 1 liter.

Numerous investigators have attempted to overcome the problems associated with low pH milk protein-containing beverages. Various processing techniques and stabilizing systems have been proposed to reduce or eliminate phase separation, sedimentation and high viscosities, all with limited success. None of the prior art investigators have overcome these problems to produce an acceptable low viscosity, low pH, high protein, high mineral, fat-containing beverage. None of these investigators have developed a low pH, high protein, high mineral, fat containing beverage having a shelf life of at least one year. The present invention, which is illustrated in the following Examples, provides a method and combination of components to overcome the shortcomings of the prior art.

SUMMARY OF THE INVENTION

In general, this invention relates to a low pH nutritional beverage of low viscosity that contains high levels of protein, vitamins and minerals having an extended shelf life and excellent physical stability. The invention also relates to a method of preparing said low pH nutritional product which is accomplished through the use of a unique mixture of starting materials and a series of specific steps. In one embodiment of the invention, these beverages are low pH products suitable for use as a complete nutritional product for children of 1–4 years of age, or for adults and older children. A complete nutritional product can be used as a sole source of nutrition for the patient, thus special attention must be paid to the protein, carbohydrate, lipid, mineral and vitamin levels. Patients can receive 100% of their nutritional requirements from such sole nutritionals.

Alternatively, these same low pH beverages can be formulated to serve as nutritional supplements. Supplements are not intended to serve as sole source nutritionals and do not supply 100% of a patients nutritional needs. They will be fortified to provide high levels of one or more nutrients. For example, low fat, high calcium products are desirable in adult females. Likewise high protein, low fat beverages that have been fortified with vitamins and calciums are advantageous in children. Other such applications will be readily apparent to one skilled in the art.

As those skilled in the art of nutrition are aware, many countries around the world have set standards or reference values for the intake of vitamins, minerals, protein, fat and carbohydrates for the typical human being. For example, the European community has set Population Reference Intakes (PRI) and Canada has recommended Daily Intakes. These countries often have separate standards for adults (i.e., over two (2) years of age) and children (i.e., under two (2) years of age).

As used herein and in the claims, the term "RDI" means the standard set for the specified nutrient in the country in which the low pH beverage is to be sold. The RDI may be specific for certain age groups (i.e., children under two (2) years of age). For example, if the inventive low pH nutritional is intended to be suitable for sole source nutrition and is to be sold in Germany, 100% of the Recommended Daily Intake in Germany for protein, calcium, vitamin C, folic acid, vitamin D, vitamin E and vitamin K will be supplied in approximately 1000 ml of the nutritional product. If intended as a supplement, then the beverage will be fortified with the relevant nutrients according to German standards. The RDI's vary slightly from country to country, if at all, and it is well within the purview of the artisan to obtain the recited value and adjust the beverage of this invention accordingly. Unless stated otherwise, all percentages recited herein and in the claims are percents by weight of the recited component to the weight of the final product.

Therefore, it is a principal object of the invention to provide an improved enteral nutritional composition for adults and children. Another object of the invention is to provide a low pH liquid food composition which: (i) utilizes a protein system selected from sodium case mate, calcium caseinate, whey protein, milk protein concentrate, milk protein isolate (a.k.a., total milk protein), whey protein concentrate and mixtures thereof; and (ii) a novel stabilizing system which generally prevents protein and calcium from precipitating or separating from the liquid food composition.

One aspect of the beverage of this invention is that a greater variety of flavors can be produced when compared to the conventional beverage having a pH of about 7.0. The beverage of the invention is designed to provide superior nutrition in a low viscosity product that possesses superior physical stability properties. As a general guideline, the beverage typically contains from about 3–20 gms of protein, from about 0–20 gms of fat, from about 100–450 calories and at least 25% of the RDI of certain vitamins and minerals, in approximately 250 ml. More typically, the beverage contains from about 3–15 gms of protein, from about 0.5–13.0 gms of fat, from about 140–300 calories and at least 25% of the RDI of certain vitamins and minerals in approximately 250 ml. The pH range of the beverage can range from about 3.0–4.6, with about 4.0–4.35 being preferred.

In yet a more preferred embodiment, the beverage contains about 5–11 gms of protein, about 1–12 gms of fat, about 190–250 calories and at least 25% of the RDI for calcium, vitamins C, D, K and E and selenium in a single serving, having an approximate volume of 250 ml, and wherein the beverage has a viscosity of less than 150 cps when measured with a Brookfield viscometer with a #1 spindle at 20° C., more preferably less than 75 cps and most preferably less than 35 cps.

The low pH matrix of the beverage provides a platform for a product with flavor diversity, no vitamin or mineral aftertaste, much lower risk of microbial spoilage, and much lower heat treatments of product which improves vitamin stability's and flavor.

There is further disclosed a liquid nutritional product having a pH of from about 3.0–4.6 comprising:
 (a) from about 45–95% by weight water;
 (b) from about 1.0–15%, and more typically about 3–15%, by weight of a source of amino nitrogen selected from sodium caseinate, calcium caseinate, whey protein, milk protein isolate, milk protein concentrate and mixtures thereof;
 (c) from about 0.1–3.3% by weight of a stabilizer system comprising high methoxy pectin;
 (d) from about 1–30%, and more typically about 1–20%, by weight of a carbohydrate;
 (e) from about 0–10%, and more typically about 0.5–10%, by weight of an edible oil;
 (f) vitamins and minerals, wherein said beverage contains at least 100% of the RDI for protein, calcium, vitamin C, folic acid, vitamin D, vitamin E and vitamin K in approximately 1000 ml;
 (g) optionally, from about 0.05–1.0% by weight of a calcium source selected from the group comprising calcium glycerophosphate, calcium citrate, calcium lactate, calcium gluconate, calcium phosphate tribasic and mixtures thereof;
 (h) optionally from about 0.1–10% by weight of an acid system comprising of at least one food grade acid selected from the group comprising citric acid, phosphoric acid, tartaric acid, lactic acid, malic acid, glucono delta lactone, dilute hydrochloric acid, acetic acid, and mixtures thereof; and;
 (i) optionally from about 0.01–5% by weight of an emulsifier system comprising at least one component selected from the group comprising lecithin, monoglycerides, diglycerides, diacetyl tartaric acid esters of mono- and diglycerides, and mixtures thereof.

There is also disclosed a liquid nutritional product having a pH of about 4.0 to about 4.4 comprising:
 (a) from about 60–90%, and more typically about 70–90%, by weight water;
 (b) from about 1–8%, and more typically about 1–6%, by weight of a source of amino nitrogen, wherein the source of amino nitrogen is a mixture of milk protein isolate and calcium caseinate;
 (c) from about 0.8–2.0% by weight of a stabilizer system comprising high methoxy pectin;
 (d) optionally from about 0.1–1.0% by weight of a calcium source, wherein the calcium source comprises a mixture of calcium glycerophosphate and calcium citrate;
 (e) optionally from about 0.3–2.0% by weight of a food grade acid, and more preferably the food grade acid is a mixture of citric acid and phosphoric acid;
 (f) optionally from about 0.1–5.0% by weight soy lecithin;

(g) optionally from about 0.1–3% by weight of an antioxidant system, comprising ascorbyl palmitate, mixed tocopherols and citrate;

(h) from about 5–30%, and more typically about 10–25%, by weight of a carbohydrate;

(i) from about 0–10%, and more typically about 0.5–5%, by weight of an edible oil; and (j) vitamins and minerals wherein the nutritional product contains at least 25% of the RDI for protein, calcium, vitamin C, folic acid, vitamin D, vitamin E and vitamin K in a single serving of approximately 250 ml.

A further embodiment of the invention relates to a nutritionally complete composition for children of 1 to 4 years of age having a pH of about 4.0 to about 4.4 comprising:

(a) from about 70–90% by weight water;

(b) from about 2–4% by weight of a source of amino nitrogen;

(c) from about 0.5–1.5% by weight of high methoxy pectin;

(d) vitamins and minerals, wherein the nutritional composition contains at least 25% of the RDI for children 1 to 4 years of age for protein, calcium, vitamin C, thiamine, iron, vitamin $B_6$, folic acid, vitamin $B_{12}$, zinc, vitamin D, vitamin E and vitamin K in approximately 250 ml.

(e) from about 0–6.0% by weight of an edible oil, wherein the edible oil comprises a high oleic oil;

(f) from about 5–15% by weight of a carbohydrate, wherein the carbohydrate comprises hydrolyzed corn starch with a DE of from 10 to 25;

(g) optionally, from about 0.1–3% by weight of an antioxidant system comprising ascorbyl palmitate, mixed tocopherols and citrate;

(h) optionally, from about 0.1–0.5% by weight of an emulsifier system comprising soy lecithin, monoglycerides and diglycerides;

(i) optionally, from about 0.5–1.0% by weight of a mixture of citric acid and phosphoric acid; and;

(j) optionally from about 0.0 to 0.5% by weight of calcium phosphate tribasic.

The source of amino nitrogen in the pediatric beverage preferably comprises milk protein isolate.

A representative RDI is the U.S. RDI which refers to the United States Food and Drug Administration (FDA) regulations establishing a Reference Daily Intake (RDI's) for various nutrients such as protein, vitamins and minerals for adults and children over four years of age and for children under four years of age and older than 13 months.

Table 1 sets forth the U.S. RDI's for selected nutrients as of the date of filing this application.

TABLE 1

| | U.S. RDI's | |
|---|---|---|
| NUTRIENT | Adults and Children over 4 years | Children under 4 years |
| Protein | 65 g* | 20 g* |
| Vitamin A | 5,000 IU | 2,500 IU |
| Vitamin C | 60 mg | 40 mg |
| Thiamin | 1.5 mg | 0.7 mg |
| Riboflavin | 1.7 mg | 0.8 mg |
| Niacin | 20 mg | 9.0 mg |
| Calcium | 1.0 g | 0.8 g |
| Iron | 18 mg | 10 mg |
| Vitamin D | 400 IU | 400 IU |
| Vitamin B6 | 2.0 mg | 0.7 mg |
| Folate | 0.4 mg | 0.2 mg |
| Vitamin B12 | 6 mcg | 3 mcg |
| Phosphorus | 1.0 g | 0.8 g |
| Iodine | 150 mcg | 70 mcg |
| Magnesium | 400 mg | 200 mg |
| Zinc | 15 mg | 8 mg |
| Copper | 2 mg | 1 mg |
| Biotin | 0.3 mg | 0.15 mg |
| Pantothenic acid | 10 mg | 5 mg |
| Vitamin K | 80 mcg | 15 mcg |
| Selenium | 70 mcg | 20 mcg |
| Manganese | 2 mg | n/a |
| Chromium | 120 mcg | n/a |
| Molybdenum | 75 mcg | n/a |
| Chloride | 3,400 mg | n/a |

*If protein efficiency ratio of a protein is equal to or better than that of casein U.S. RDI is 45 gms for adults and 16 gms for children under 4 years of age.
n/a = not applicable Table 2 sets forth some representative RDI's that have been established in the European Community (EP), Canada and Germany.

TABLE 2

| | RDI's of Canada, EP and Germany Per Day | | | | |
|---|---|---|---|---|---|
| | CANADA | | | | |
| | Persons 2 years of age and older | Infants or children less than 2 years of age | GERMANY | | EP Average Requirement |
| NUTRIENT | INTAKE | INTAKE | MINIMUM | MAXIMUM | * Adult |
| Calcium (mg) | 1100 | 500 | 800 | 1800 | 550 |
| Vitamin C (mg) | 60 | 20 | 40 | 120 | 30 |
| Folate (mcg) | 220 | 65 | 100 | 400 | 140 |
| Vitamin D (mcg) | 5 | 10 | 2.5 | 15 | 0–10 |

TABLE 2-continued

RDI's of Canada, EP and Germany Per Day

| | CANADA | | | | |
| --- | --- | --- | --- | --- | --- |
| | Persons 2 years of age and older | Infants or children less than 2 years of age | GERMANY | | EP Average Requirement |
| NUTRIENT | INTAKE | INTAKE | MINIMUM | MAXIMUM | * Adult |
| Vitamin E (mg) | 10 | 3 | 6 | 24 | — |
| Vitamin k (mcg) | — | — | 30 | 120 | — |

* Taken from Reports of the Scientific Committee for Food, (31st series) "Nutrient and energy intakes for the European Community."

There is also disclosed a method for preparing a nutritional composition, said method including the steps of: (a) preparing an oil blend wherein said oil blend comprises an edible oil, an emulsifier, vitamins A, D, E and K, ascorbyl palmitate and mixed tocopherols; (b) preparing a carbohydrate/mineral slurry by mixing pectin with water at less than 10% by weight total solids under high shear and at a temperature between 65 and 71° C. (150–170° F.) for at least ten (10) minutes and thereafter adding a source of major minerals, trace/ultra trace minerals and carbohydrates; (c) preparing a protein slurry by combining protein with water, under agitation, to obtain an aqueous mixture of at least 8% by weight solids; (d) combining the protein slurry, carbohydrate/mineral slurry and the oil blend to form a protein/carbohydrate/ mineral/oil mixture; (e) homogenizing the protein/carbohydrate/ mineral/oil mixture through a homogenizer at a pressure of at least 17 MPa (2,500 Psig) to form a homogenized blend; (f) acidifying the homogenized blend of step (e) with an edible acid to a pH ranging from about 3.0–4.6; (g) adding to the homogenized mixture at least one component selected from the group consisting of flavors, colors, vitamins, fruit juices, water, folic acid, cysteine and ascorbic acid; (h) homogenizing the acidified mixture from step (g) by passing the mixture through a homogenizer at a pressure of at least 17 MPa to form an aqueous food solution; and (i) heating said aqueous food solution to a sterilization temperature for a time sufficient to kill or inactivate substantially all microorganisms in said food solution.

One aspect of the present invention relates to the above described unique process of manufacture which produces a beverage with excellent physical stability even after retort sterilization, aseptic packaging and hot-fill processes. It has been discovered that preparing the carbohydrate/mineral slurry by initially mixing pectin with water at less than about 10% by weight total solids prior to the addition of the calcium, trace/ultra trace minerals and carbohydrates is important to producing a physically stable product. An additional method of preparing the inventive beverage, especially a pediatric beverage, comprises the steps of combining the source of amino nitrogen (i.e., milk protein isolate) with the pectin and then subjecting the-mixture to homogenization at a pressure of at least 6.8. MPa, more preferably, 17.6 MPa (2,000 psig). The homogenized blend is then combined with the other ingredients to produce the beverage. This step of homogenizing the protein and pectin is in addition to the two homogenizations described below.

Further, it has been discovered that two homogenization steps are required, one prior to and one subsequent to acidification, to provide a beverage of acceptable physical stability over shelf life. The first homogenization should be at a pressure of at least 17 MPa (2,500 psig) and more preferably is a two stage homogenization at about 27 MPa (4000 psig) and about 3.5 MPa (500 psig). After acidification, the homogenization pressure of a single stage homogenizer should be at least 17 MPa (2,500 psig) and preferably at least 20.4 MPa (3,000 psig). If this last homogenization is after acidification, but prior to a final heat treatment, an additional homogenization of at least 6.8 MPa (1,000 psig) should be conducted prior to filling. More preferably, this additional homogenization should be at least 10.3 MPa (1,500 psig).

It will be understood by those skilled in the art that the described nutritional formula can be in a ready-to-feed form or in the form of a concentrate or powder. Preparation of the concentrate and powder forms can be accomplished using known techniques and equipment.

In one embodiment of the invention, the nutritional formula of the invention has a pH of from about 3.0–4.6 and comprises:

(a) a source of amino nitrogen comprising milk protein isolate and calcium caseinate;

(b) a stabilizer system comprising high methoxy pectins, optionally in combination with microcrystalline cellulose and sodium carboxymethylcellulose;

(c) a source of calcium comprising calcium citrate and calcium glycerophosphate;

(d) an antioxidant system comprising mixed tocopherols and ascorbyl palmitate; and (e) L-cysteine.

The nutritional formula may additionally comprise:

(a) an antimicrobial system comprising potassium sorbate, potassium benzoate and mixtures thereof;

(b) a source of edible oil selected from high oleic safflower oil, soy oil, fractionated coconut oil, high oleic sunflower oil, corn oil, canola oil and mixtures thereof; and (c) sources of vitamin C, folic acid, vitamin D, vitamin E and Vitamin K at concentrations to achieve at least 25% of the U.S. RDI in approximately 250 ml.

It should be understood that the levels of the vitamins can be adjusted to meet the needs of humans four (4) years of age and older and for children of thirteen (13) months to four (4) years of age.

A further embodiment of this invention is a process for improving the long term physical stability of low pH beverages containing substantial quantities of protein, calcium, vitamins and other minerals. A characteristic problem of low pH beverages is the tendency of sediment to form at the bottom of the beverage container. This sediment contains calcium, other minerals, protein, etc. Asides from the unattractiveness of this sediment, these precipitated nutrients cannot be shaken back into solution and do not provide the nutrients required to maintain the health of the patient.

A new stabilizer has been discovered that will solve this problem. High methoxy pectin, in sufficient quantities, will produce a low pH beverage that will remain physically stable for at least one year. Physical stability refers to either an absence of sediment or a significant reduction in the occurrence of the formation of sediment, for at least a 12-month period. Alternatively, a combination of stabilizers may be utilized to produce this same effect.

A new source of calcium has also been discovered for low pH beverages containing substantial quantities of protein. It has been discovered that an admixture of calcium glycerophosphate and calcium citrate can be utilized in such beverages without having adverse effects upon the viscosity and stability of the beverages. Certain calcium sources, such as calcium citrate malate, caused the protein to gel in a relatively short period of time and thus rendered the beverages undrinkable. Such finding were unexpected since calcium citrate malate is routinely added to acidic beverages such as orange juice.

DETAILED DESCRIPTION OF THE INVENTION

Acidified milk-based drinks have gained popularity throughout the world over the last five (5) to ten (10) years. Milk can be acidified microbiologically, but also can be blended with fruit juices and edible acids to produce beverages that possess a refreshing natural fruit taste due to their low pH. However, the low pH causes a number of problems that are aggravated when a beverage contains high concentrations of protein and certain nutrients such as calcium. The beverage and method of the present invention, including the materials used therein, the particular process steps and the characteristics of the nutritional beverage prepared according to this invention, are described in detail as follows:

A. Protein System

For purposes of the present specification, the term "caseinate" means the product resulting from the sodium or calcium hydroxide neutralization of acid casein. Acid casein is used in its broadest sense and covers both traditional acid casein, obtained directly by acidifying milk, and acid casein obtained indirectly, such as, for example, a re-acidified rennet casein. For purposes of the present specification, the terms "whey protein concentrate" and "whey protein isolate" are defined to mean a water soluble or suspendible, essentially undenatured protein fraction derived from cheese whey or as a by-product of casein production. Whey protein is a naturally occurring protein and is specific and identifiable in terms of its composition and is not necessarily dependent upon the process used to produce it. Whey protein may be obtained by methods such as ultrafiltration or gel filtration. Milk protein isolate (a.k.a., total milk protein) can also be used in the beverage and is available from the Kerry Ingredients of Beloit, Wis. and total milk protein from New Zealand Milk Products of Santa Rosa, Calif. In one embodiment of the invention, a 65/35 weight % mixture of the milk protein isolate and calcium case mate is preferably used in the adult product. In other embodiments, the beverage uses milk protein isolate at 60 weight % of total protein or total milk protein at 100%. Milk protein isolate is 82% casein and 18% whey and is manufactured by ultrafiltration, thereby the whey to casein ratio is the same as regular milk. This protein is highly desirable in the inventive beverage as it possesses superior flavor and functionality.

For certain low pH beverages in which the caloric density is increased beyond 1.0 kilocalorie per ml, it may be desirable to utilize partially hydrolysed whey as part of the protein source. Soy protein isolate may also be used. The amount that can be incorporated can vary widely, but will typically range from 10 to about 30 w/w % of the total protein present in the system. This partially hydrolysed whey will serve to help control the osmolality of the final formula. Partially hydrolysed whey is available from numerous:commercial sources including Kerry Ingredients of Beloit, Wis. Gelatin, which is obtained from fish, pigs, or cows, may also be used to control osmolality. The amount of gelatin will fit within the ranges described above and is available from numerous commercial sources.

The amount of protein used in the present beverage may vary widely, but for most applications from 1–15% by weight is suitable, more typically between about 1–8 % by weight and more often between about 1 and 6% by weight. In general, the source of amino nitrogen can include any known source such as soy protein, vegetable proteins, cereal proteins, meat, fish and the like. In the nutritionally complete child product, it has been determined that milk protein isolate is the preferred source of amino nitrogen, especially when the product is terminally sterilized. The amino acid profile of the protein system is preferably designed to meet the human amino acid requirement for adults. See *Recommended Daily Allowances,* 10th Edition, FNB/NRC.

B. Stabilizer System

Various food stabilizers can be employed in the present invention and include hydrophilic colloidal stabilizers known as gum arabic, pectins, gelatin, xanthan and LBG as well as the anionic polymers derived from cellulose such as CMC. These stabilizers are water soluble and tolerate a low pH which is encountered in the inventive beverage.

Pectins are used in the present invention to enhance physical stability and control the viscosity of the beverages. The pectin stabilizes the milk proteins to yield products without significant sedimentation and phase separation (i.e., physical stability) and ensures a smooth mouthfeel without any "sandiness" and they help control viscosity by stabilizing free water. Pectins are a class of complex polysaccharides found in the cell walls of higher plants. The number of plant sources that are used for the commercial production of pectins is fairly limited. At present, apple pomace and citrus peels are the main sources of commercially acceptable pectins. They, however, produce slightly different pectins, which make one or the other more,suitable for specific applications. Other sources of pectin include sugar beets and the seed heads of sunflowers. Citrus pectins are preferred in the present invention and most preferred is orange pectins.

The ability of pectins to form a gel depends on the molecular size of the molecule and the degree of methoxylation (DM). The chemical structure of pectin has been the subject of many scientific investigations. Elucidation of pectin structure is important to understanding its role in food processing and as a nutritional fiber. Like most other polysaccharides, pectins are both polymolecular and polydisperse; that is, they are heterogeneous with respect to both chemical structure and molecular weight.

The composition of pectin varies with the source and conditions of extraction, location, and other environmental factors. Based on solubility, two different types of pectins exist: water-soluble or "free pectin" and the water-insoluble pectins. Solubility in water is related to the degree of polymerization and the number and distribution of methoxyl groups.

The most unique property of pectins is their ability to form gels in the presence of $Ca^{2+}$ ions or sugars and acid. Depending on the DM, pectins are classified into: 1) low methoxy (LM) pectin with a DM of 25–50% and 2) high methoxy (HM) pectin of 50–80% DM. LM and HM pectins form gels in the presence of calcium ions and acid, respectively. The mechanism of gel formation is different in both HM and LM pectins. HM pectins form gels if the pH is below 3.6 and a cosolute is present.

Pectins have always been a natural constituent of human foods and its use is allowed in all the countries of the world. Pectin has been used in a number of foods such as jellies, preserves, jams, dietetic soft drinks, ice cream and as a fat or sugar replacement in low-calorie foods. Pectins also have uses in the pharmaceutical industry.

The pectins useful in the present invention are the HM pectins and are available from The Copenhagen Pectin Factory Ltd. of Denmark and Hercules Food Ingredients, Wilmington, Del. The preferred HM pectins are known as GENU® JMJ, GENU® JM, GENU® JM 150, and GENU® YM100H manufactured by Hercules Food Ingredients. The GENU® HM pectins are used in this invention to stabilize the protein at low pH.

The concentration-of the HM pectin used herein can range from about 0.1–3.3% by weight, more preferably 0.1–2% by weight, even more preferably from about 0.5–1.5% by weight and most preferably from about 0.6–1.25% by weight. The amount of HM pectin, such as GENU, used, is dependent, in part, on the level of protein present in the beverage product. In general, the greater level of protein, the more HM pectin will be required to stabilize the low pH beverage. The stabilizing system can comprise the use of high methoxy pectin alone, or alternatively the high methoxy pectin may be used in combination with other stabilizers. For example, the stabilizing system may contain materials such as specially processed pectins which reduce sediment and phase separation through increasing viscosity (i.e. Slendid 200) and micro crystalline cellulose. Slendid 200 is a high ester pectin which is extracted from citrus peel and standardized by the addition of sucrose, however, the molecular structure has been modified during the extraction process to build viscosity and hold water.

One source of microcrystalline cellulose useful in the invention is Avicel® cellulose gel from the FMC Corporation of Philadelphia, Pa. One preferred form of Avicel is Avicel CL-611 which is a colloidal grade and comprises a 85% by weight microcrystalline cellulose (MCC) and 15% by weight sodium carboxymethylcellulose (CMC). One aspect of the present invention resides in the discovery that the low pH beverage can be adequately stabilized against physical degradation over shelf-life through the use of high methoxy pectins (HM Pectins) alone, or optionally in combination with MCC and CMC. The amount of HM pectins, CMC and MCC used in the inventive formula, as a % by weight of the formula, can vary as follows:

| HM Pectin | about | 0.1–2.0 w/w % |
|---|---|---|
| CMC | about | 0.005–0.5 w/w % |
| MCC | about | 0.005–1.0 w/w % |

In a more preferred embodiment, the ranges are as follows:

| HM Pectin | about | 0.5–1.0 w/w % |
|---|---|---|
| CMC | about | 0.01–0.3 w/w % |
| MCC | about | 0.05–0.1 w/w % |

In yet a more preferred embodiment, the ranges are as follows:

| HM Pectin | about | 0.7–0.9 w/w % |
|---|---|---|
| CMC | about | 0.01–0.02 w/w % |
| MCC | about | 0.07–0.1 w/w % |

In the most preferred embodiment, the levels are as follows:

| HM Pectin | about | 0.8 w/w % |
|---|---|---|
| CMC | about | 0.015 w/w % |
| MCC | about | 0.085 w/w % |

In the nutritionally complete child product, the stabilizer is present at from about 0.5 to about 1.5% by weight, more preferably from about 0.5 to 1.0% by weight, and consists of only high methoxy pectin.

In a preferred embodiment of the invention, the HM pectin is mixed with a source of carbohydrate and nutrients (i.e., calcium, trace and ultra trace minerals) to form an aqueous carbohydrate/mineral slurry. The carbohydrate/mineral slurry is then combined with the protein slurry and the oil blend and further processed. To realize the full benefit of the invention disclosed herein, the pectins (e.g., GENU and Slendid 200) should be added first and it should be agitated at a rate and for a time sufficient to properly hydrate the HM pectin. Minerals and carbohydrates are added once the pectins are fully hydrated.

C. Calcium Source

One important aspect of the low pH beverage of this invention is that it can, in relatively little volume, deliver significant levels of bioavailable calcium. It is, in part, the high concentration of soluble $Ca^{2+}$ ions that causes some of the physical instability, sedimentation and mouthfeel problems of a nutrient rich, low pH beverage.

In general, any known source of $Ca^{2+}$, that does not adversely affect the product, can be utilized in this invention. Typically, at least one source will be selected from calcium glycerophosphate, calcium citrate, calcium phosphate tribasic and calcium lactate. Preferably, calcium glycerophosphate and calcium citrate in about a 40:60 weight ratio is used as they are more soluble than other sources of calcium and also have a less chalky mouthfeel. In one embodiment of the invention, the source of bioavailable calcium is a 40:60 mixture of calcium glycerophosphate and calcium citrate. Other embodiments include calcium sources such as calcium lactate and calcium gluconate in combination with calcium citrate. The amount of the calcium source in the beverage can range from about 0.05–1.0%. by weight. As used in this application, any reference to an amount of calcium refers to the amount elemental calcium that should be utilized and not the amount of the calcium salt. Preferably, the level of calcium results in 25–50% of the RDI for the average adult in a volume of approximately 250 ml of the beverage. In the nutritionally complete child product, the source of calcium is preferably calcium phosphate tribasic at a concentration of 0.0–0.5% by weight (elemental calcium).

As is described in greater detail in Example XIII, it was discovered that calcium citrate malate was not compatible in an acidic solution containing proteins. The calcium citrate malate caused the proteins to gel, thereby rendering the beverage unsuitable for consumption. This was a most unexpected finding since calcium citrate malate is routinely added to orange juice which has an acidic pH.

If desired, sources of boron may be added to the nutritional to enhance the absorption of calcium. The amount of boron can vary widely but will typically range from about 500 micrograms to about 600 micrograms per single serving. Sodium borate is currently the preferred source of boron.

D. Acidulants

The present invention typically employs a food acid, or acidulant, to adjust the pH of the final nutritional product to a range of from about 3.0–4.6, more preferably from about 4.0–4.4 and most preferably from about 4.1–4.3. However, such a food acid is not required as long as other ingredients contained within the formulation lower the pH (i.e., fruit juices, flavorings, etc.).

Typically, the food acid is added in an amount ranging from about 0.1% to about 10%, more preferably about 0.2%–5% and most preferably from about 0.3% to about 2% by weight of the beverage. It is also within the scope of this invention to increase the level of the food acid up to about 1% by buffering the pH with buffering salts. In general, any known acidification agent can be used in this invention (i.e., lactic acid-producing organisms, mineral acids and food grade acids). Preferably, the acidulants for this invention are food grade acids selected from citric acid, phosphoric acid, tartaric acid, lactic acid, malic acid, glucono delta lactone and mixtures thereof. The inventors herein evaluated a number of acidifying systems based on the resulting organoleptic properties imparted to the beverage. It was determined that in the inventive beverage, which contains high levels of proteins and minerals which act as buffering agents, a significant amount of acid is typically required to lower the pH. It was determined that a mixture of citric acid and phosphoric acid solutions (at about 50% by weight concentration) at about a 70:30 weight ratio is preferred.

E. Emulsifier System

Optionally, an emulsifier can be added to the low pH beverage. If utilized, the emulsifier system is preferably at least one component selected from the group consisting of lecithin, monoglycerides, diglycerides, diacetyl tartaric acid esters of mono- and diglycerides, and mixtures thereof. Of the various food emulsifiers currently available, only three (3) have GRAS (Generally regarded as safe, FDA) status: lecithin, mono-diglycerides and diacetyl tartaric acid esters of mono- and diglycerides. The preferred emulsifier system is soy lecithin alone or in combination with diacetyl tartaric acids and esters of mono- and diglycerides Lecithin is an amphoteric surfactant that will be positively or negatively charged, depending on the pH of the environment. Mono-diglycerides are non-ionic surfactants. Diacetyl tartaric acid esters of mono-diglycerides are ionics with a very hydrophilic component attached. These hydrophilic components are carboxylic acids and can act as such or as the respective anions. They work by imparting a negative charge to the fat globules in the matrix, thus causing them to electrostatically repel each other so that no flocculation or coalescence occurs. Panodan® is a brand of diacetyltartaric acid esters of mono- and diglycerides made from edible, refined vegetable fat by Danisco Ingredients Company Products, Inc. of Kansas, USA. Soy lecithin alone is the preferred emulsifier due to its lower melting point and ease of incorporation into the oil blend. The amount of the emulsifier is chosen to suit the particular beverage and generally ranges from about 0.01–5.0% by weight of the liquid nutritional product. The nutritionally complete child product preferably uses a mixture of lecithin, monoglycerides and diglycerides as the emulsification system at a concentration of about 0.1–0.5% by weight.

F. Antioxidant System

The beverage of this invention may also optionally contain an antioxidant system at a concentration from about 0.001–5% by weight to prevent the degradation of the unsaturated lipid component. Protection of the unsaturated lipid is especially important when the beverage is in powdered form. At low pH, the triglycerides in the oils can hydrolyze and release free fatty acids which are prone to oxidation and heat can accelerate this reaction. Protection of the lipid component is especially important when soy oil, canola oil and/or marine oil are utilized in the beverage due to their degree of unsaturation. The antioxidant system employed herein uses a system of naturally occurring ingredients that comprise mixed tocopherols and ascorbyl palmitate. In a second embodiment, the three-part antioxidant system comprises ascorbyl palmitate, mixed tocopherols and citrate. The nutritionally complete child product preferably contains from about 0.1–3% by weight of the three-part system.

G. Carbohydrates

The quantity of carbohydrate that is utilized in these low pH products can vary widely. The amount of carbohydrate will typically range from about 1–30%, more typically about 1–25% and most preferably about 5–20%, by weight.

The carbohydrates may be any of the digestible carbohydrates such as dextrose, lactose, fructose, sucrose, maltose, corn starch, hydrolysed corn starch, maltodextrin, glucose polymers, corn syrup solids, oligosaccharides, high saccharides, high fructose corn syrup or mixtures thereof, depending on usage.

If desired, indigestible carbohydrates may optionally be incorporated into the formula. One such example is an indigestible oligosaccharide such as fructooligosaccharide. Fibers, both soluble and insoluble may be incorporated into the beverages. Examples of such fibers include soy, oat, pea, beet, cellulose, corn, gum arabic, sodium carboxymethylcellulose, guar gum, citrus pectin, barley and psylium.

In the nutritionally complete child product, the carbohydrate is at 5–15% by weight and is preferably hydrolyzed corn starch with a DE (dextrose equivalent) of 10 to 25. A hydrolyzed carbohydrate is desirable since it keeps the osmolarity down and is easily digested.

H. Edible Oils

The lipids or edible oils useful in the beverage of the invention are those known to be consumable by a human. The quantity can vary widely depending upon the end use of the product. For example, if the product is intended to be suitable as a sole source of nutrition it will have a relatively high level of fat, so that a sufficient number of calories can be provided to the patient to prevent malnutrition. If the beverage is only intended as a supplement to provide calcium, proteins or vitamins, then it can be fat-free. The amount of oils and the types required to accomplish these results are well known to those skilled in the art. However as a general guideline, the beverages will contain from about 0–10% by weight of an edible oil.

In one embodiment of the invention, the edible oil component is a mixture comprising soy oil and marine oil (i.e., oil derived from fish, fungal and genetically engineered plants that contain high levels of n-3 and/or n-6 polyunsaturated fatty acids at a level of from about 0.5–10% by weight. In another embodiment, the inventive beverage uses a mixture of canola oil and high oleic safflower oil. In one embodiment of the invention for children, the oil blend comprises high oleic safflower oil, soy oil, and fractionated coconut oil. The concentration of the edible oil in the child's product is preferably from about 4.0 to 6.0% by weight and should be a high oleic oil, as children need this fatty acid.

However numerous other oils or combinations of oils may be incorporated into the beverage. Examples of suitable oils include olive, borage, black currant seed, corn, marine oils, fungal oils, safflower, high oleic safflower, sunflower, high oleic sunflower, evening primrose, cottonseed, rice bran, grapeseed, flaxseed, garlic, peanuts, almonds, walnuts, wheat germ, egg, high oleic sunflower oil, and sesame.

I. Vitamins and Minerals

Vitamins, minerals and other trace elements can be used to supplement the food composition and for purposes of total nutritional balance. These supplements can be varied as desired but are typically equal to the RDI or greater, based on 2,000 calories per day. In a preferred embodiment of the invention, at least 25% of the RDI for vitamins A, D, E and K are supplied in approximately 250 ml of the beverage as well as 25% of the RDI for calcium and selenium.

After numerous sources of magnesium were evaluated (e.g., magnesium carbonate, magnesium citrate, magnesium gluconate, magnesium hydroxide, magnesium sulfate and the like), it was determined that about a 30:70 weight ratio of magnesium phosphate dibasic and magnesium chloride is preferred for the inventive beverage. This mixture is preferred due to its clean taste and buffering capacity. Also preferred is the use of magnesium gluconate as the source of magnesium due to its non-bitter taste. Minerals with a low buffering capacity are desired so that less acid is required when bringing down the pH of the beverage to below 4.2.

In the nutritionally complete child beverage, it is preferred that it contain at least 100% of the RDI for children for protein, calcium, vitamin C, thiamine, iron, vitamin $B_6$, folic acid, vitamin $B_{12}$, zinc, vitamin D, vitamin E and vitamin K in approximately one liter of the beverage.

J. Other Ingredients

The beverage of this invention can include a fruit juice component, especially for the child beverage. The fruit juice can be any citrus juice, non-citrus juice or mixtures thereof which are known for use in edible products. Examples of such fruit juices include, but are not limited to, non-citrus juices such as apple juice, grape juice, pear juice, nectarine juice, currant juice, raspberry juice, strawberry juice, kiwi juice, watermelon juice, cherry juice, cranberry juice and mixtures thereof. Representative of the citrus juices useful in the inventive beverage include orange juice, lemon juice, lime juice, grapefruit juice, tangerine juice and mixtures thereof. Apple and pear juice is especially preferred for use herein.

The beverages prepared according to the present invention typically contain about 0% to about 50% fruit juice, preferably from about 3 to about 25% fruit juice, most preferably from about 3 to about 15% fruit juice. The fruit juice may be incorporated into the beverage as a puree, comminute or as a single strength or concentrated juice. Most preferred is the incorporation of a fruit juice as a concentrate with a solids content of between 20 and 80% by weight. The beverage of the present invention may also employ other flavors, alone or in combination, with the fruit juice.

Conventional coloring agents, such as approved colors, may be used as well as the conventional antioxidants, such as BHT and BHA. In one preferred embodiment L-cysteine, an amino acid, is added to protect the vitamin C from degradation. Typical levels of L-cysteine can range from 0.001 to 0.1% by weight.

Through the work of the inventors, it has been determined that the inclusion of the free amino acid L-cysteine in the inventive formula is preferred as it provides for acceptable visual appearance of the product and improves the stability of vitamin C in the product. L-cysteine acts as a reducing agent to inhibit the oxidation of vitamin C. It has been found that without the addition of sufficient levels of L-cysteine, oxidation of the vitamin C caused discoloration of the product (taupe/coffee color) after about one month of room temperature storage, with increasing discoloration over time. This problem can also be overcome by elimination of oxygen from the headspace of the container. This is not acceptable in a fruit flavor product as it decreases the consumers compliance. The minimum level of L-cysteine should be used to stabilize the vitamin C as excess levels will impart a sulfur or chemical-like taste and aroma to the product. The actual optimal level is thus dependent upon the level of vitamin C incorporated into the product.

The beverage of this invention may comprise from about 45 to about 95% water by weight. It should be understood that when the beverage according to the invention is in powdered form, water content is typically in the range of less than 5% and more preferably below 3%. The ready-to-feed beverage preferably comprises from about 60 to about 90% water; most preferably from about 75 to about 85% water. The water may be added directly, or it may be provided from alternative sources such as fruit juices, flavorings, etc. Soy bran, rice bran or other fiber polysaccharides or sources of fiber can be included in the beverage according to this invention as is known in the art.

The beverage of the present invention may also employ a sweetener. Representative of the sweeteners useful in this invention include maltose, sucrose, glucose, fructose, invert sugars and mixtures thereof, which also form part of the carbohydrate component. The sugars may be incorporated into the beverage in solid or liquid form but are typically incorporated as a syrup such as a high fructose corn syrup. It should be understood that the other components of the beverage, such as the fruit juice component, optional flavors and the like, may provide a sweetening component to the beverage. Sweeteners comprise from about 0.1 to about 20% by weight, more preferably from about 6 to about 14% by weight of the inventive beverage. The sweeteners for use in the beverage may be sucrose, fructose and mixtures thereof. The total carbohydrate component, including sweeteners, can range from 1–20 weight %, more preferably from 5–15 weight %.

Optionally, artificial or non-caloric sweeteners can be used in the present invention alone or in combination with nutritive sweeteners. Examples of the artificial or non-caloric sweeteners include, for example, saccharin, cyclamates, acetosulfan-K, polydextrose, L-aspartame, sucralose, low alkyl ester sweeteners and the like. Artificial or non-caloric sweeteners, if used, are typically employed in an amount ranging from about 0.005 to about 1% by weight. More preferably, from about 0.005 to about 0.1% by weight of the beverage. In one embodiment of the invention the combined use of a caloric and non-caloric sweeteners is contemplated.

The beverage of the present invention may also, optionally, employ a preservative. Any food grade preservative can be used and suitable preservatives include sorbic acid, benzoic acid, alkali metal salts thereof and mixtures thereof. Preferred preservatives include sorbic acid, potassium sorbate, potassium benzoate, sodium benzoate, sodium sorbate and mixtures thereof. The preservative is typically present in a total amount ranging from about 0.04 to about 0.2% by weight. More preferably, the preservative is in the range from about 0.04 to about 0.1% by weight. In a preferred embodiment, the beverage contains about 0.03% by weight potassium sorbate and about 0.06% by weight potassium benzoate.

As mentioned above, the beverages according to the invention are fortified with various vitamins and minerals. The level of the vitamins and minerals contained within the beverage will preferably supply at least 100% of the U.S. RDI for vitamins A, B, C, D, K and the minerals calcium, iron, phosphorus and manganese in approximately 1000 ml of the low pH beverage. This may be expressed alternatively as "the beverage will preferably supply at least 25% of the U.S. RDI for vitamins A, B, C, D, K and the minerals calcium, iron, phosphorus and manganese in a single serving of the low pH beverage, which is approximately 250 ml. Approximately 250 ml is meant to convey an amount an adult can easily consume in one setting, such as, for example, from 225–275 ml.

As mentioned previously, vitamin C is known to degrade via oxidation at low pH values and thus, it is preferable to add the amino acid cysteine as a reducin agent. The level of cysteine should be about 2–15 weight % of the ascorbic acid added. In a preferred embodiment, the beverage contains from 30–50% of the RDI for vitamin C and the L-cysteine can range from 10 to 100 ppm. When about 30% of the RDI for vitamin C is used in the product, the level of L-cysteine can range from 20–40 ppm or 0.002 to 0.004% by weight.

The caloric content of the inventive beverage can be adjusted to any desired level up to about 3 calories per cubic centimeter. The caloric density of the beverage can vary widely. Typically their density will range from about 0.5 kcal per ml up to about 2.0 kcal per ml, and more preferably no greater than about 1.5 kcal. per ml. Most preferred is a caloric density of about 0.8–1.2 kilocalories per ml. The osmolarity of the beverage can range from 250–650, but preferably is in the range of 275–550 mOsm.

Process Steps

The beverage according to the invention can be prepared using conventional equipment and process technology known to those skilled in the art. The incorporation of the pectin components can be accomplished in two (2) general manners. The first approach to pectin incorporation comprises the dry blending of the pectin into a portion of the carbohydrate (i.e., sucrose) at a weight ratio of about 1:5, pectin to carbohydrate. The pectin/carbohydrate dry blend is then added to hot water with agitation. The remaining portion of the carbohydrate is then added after the pectin has become fully hydrated. The minerals are then added to the pectin/carbohydrate solution to form the carbohydrate/mineral slurry.

A more preferred process comprises mixing the pectin with water under high shear mixing and at a temperature of between 65° C. and 75° C., more preferably between 65° C. and 71° C. The pectin solution should not exceed about 10% pectin by weight. After mixing for about 10 minutes, the source of calcium is added to the solution following by addition of the major minerals, trace/ultra trace minerals and the carbohydrate, thus forming the carbohydrate/mineral slurry.

In yet another preferred embodiment, especially for the pediatric product, it has been found useful to combine the protein and the pectin and subject the mixture to homogenization prior to combination with other beverage components. It has been found that a homogenization of the pectin protein mixture at a pressure of at least 1,000 psig is satisfactory.

An oil blend is prepared by mixing the edible oil with the emulsifier system, vitamins A, D, E and K, ascorbyl palmitate and mixed tocopherols.

The protein slurry is prepared by mixing the source of protein with a portion of the product water under agitation to a protein content of about 5% by weight.

The protein slurry is then combined with the carbohydrate/mineral slurry and subsequently with the oil blend to form a protein/carbohydrate/mineral oil mixture. This mixture is then preferably subjected to a two-stage homogenization wherein the second stage is from 3.5–4.1 MPa (500–600 psig) and the first stage pressure is from 17.2 to 27 MPa (2,500–4,000 psig). The homogenized blend is then acidified with an edible acid and/or fruit juice to a pH of about 3.0–4.6. A preferred edible acid comprises a mixture of phosphoric acid and citric acid at a weight ratio of about 1:3. At this point, flavor, colors, vitamins, water, folic acid, cysteine and ascorbic acid may be added to the acidified mixture. The pH of the mixture is finally adjusted to a pH of about 4.0 to 4.35 and again homogenized at a pressure of at least 17 MPa after sterilization to form an aqueous food product. If the product is again subjected to further heat treatment, for example in aseptic packaging, an additional homogenization at a minimum of 6.8 MPa (1,000 psig), preferably 10.3 MPa (1,500 psig) should be conducted prior to the filling of containers with product.

In this process, it is important that the carbohydrate/mineral slurry be added to the protein under conditions of high shear so as to assure that the protein and stabilizer particles have an average particle size of less than about 1 micron, preferably less than about 0.8 microns and most preferably less than about 0.5 microns. As used herein, the term "high shear" refers to conditions exemplified, but not limited to, a homogenizer operating at about 4,000/500 psig (27/3.5 MPa) and a high shear mixer with a batch turn-over rate of 1–5 minutes. Those skilled in the art will readily appreciate the parameters under which the homogenizer must be operated to achieve the recited pressures. Without being bound to any theory, it is postulated that the homogenization prior to the addition of the edible acid and/or fruit juice allows for the proper interaction between the pectin and the proteins. Another important aspect is that a second homogenization occurs subsequent to the acidification with the acid blend and preferably after a final heat treatment.

The temperature range to which the beverage is subjected to during processing is not critical, however it is highly advantageous to maintain the process subsequent to the first homogenization between 10° C. and 40° C. Subsequent to the acidification and second homogenization of the beverage, the product is held under low shear conditions.

The beverage according to the present invention has a pH ranging from about 3.0 to about 4.6, preferably from about 4.0 to about 4.6 and most preferably from about 4.0 to about 4.35. The beverage exhibits little or no sedimentation and any sediment that does form is readily dispersed upon mild shaking. This physical stability lasts for at least 12 months despite the high levels of protein, calcium, and other minerals. The beverages described herein are pleasant tasting, smooth textured and may or may not be carbonated. The beverage according to the invention may also be dried and supplied in the form of a powder which can be readily reconstituted with water or juices.

As used herein, any use of the term "about" should be construed as referring to both of the number specified in any range. Any reference to a range should be considered as providing support for any subset within that range. For example, a range of 1–10 should be considered to provide support for a range of 7–9, 3–6, 2–8, etc. Any reference to a single serving is referring to a volume that can be consumed by an adult in one setting, approximately 250 ml(225 ml–275 ml), and more preferably about 237 ml.

The following Examples depict the presently preferred embodiments of the invention for the purposes of illustrating the practice thereof and do not, in any way, limit the scope of the invention.

EXAMPLE I

Protein System

The materials employed in the process of preparing the inventive beverage include milk components, food acids, as well as other ingredients such as a source of calcium, trace and ultra trace minerals. The protein system or source of amino nitrogen utilized in the low pH beverage of this invention was carefully selected based on the sensory characteristics of the protein at low pH. Over fifty (50) proteins or protein combinations that included casein, whey, total milk proteins, pea and soy were examined in both 5% by weight solutions and in a low pH model system composed of 5% carbohydrate, 5% protein, 0.6% pectin, citric and lactic acids. The solutions ranged from clear to cloudy and opaque with sediment, with whey separation occurring in some solutions. The taste of the various protein systems ranged from milky to bitter, burnt and brothy. Proteins were excluded from further consideration due to unacceptable flavor, instability and availability. Preferred proteins were then evaluated in a complete formulation similar to that set forth in Table 6 and screened for sensory characteristics. The screening indicated that a protein system containing 70–80% sodium caseinate combined with 28–30 weight % whey protein was the most preferred. An additional protein system found to be useful in the present invention included milk protein isolate in combination with calcium or sodium caseinate. In the children's beverage according to this invention, the use of total milk protein is preferred, especially if subjected to terminal sterilization.

EXAMPLE II

Pectin Evaluation

Numerous types of pectin are known and used in the food industry in products such as jams, jellies, ice creams, fat substitutes and the like. This experiment was conducted to evaluate various high methoxyl (HM) citrus pectins for the stabilization of the high protein content, low pH beverage of this invention. A number of pectins from various suppliers were initially screened for their ability to stabilize proteins at low pH. Those pectins that resulted in a stable product after a high temperature short time (HTST) treatment in either hot fill or aseptic packaging were further evaluated.

Four (4) pectin candidates were selected for evaluation of their mouthfeel and viscosity increasing properties. Three (3) pectins from the Danisco Ingredients Co. of USA known as RS400, RS450 and AM491 were compared to Hercules JMJ. Table 3 sets forth the level of pectin addition, the sensory comments and the initial viscosity of the product.

Light micrographs of each Sample were obtained to evaluate protein aggregation. Samples 1–3 showed large aggregates that represent a physically unstable product. The light micrograph of Sample 4 showed good stabilization of the proteins as indicated by small aggregates throughout the product.

The level of pectin required in a product to assure physical stability depends on the amount of protein present, pH, soluble solids content, fat content, ionic concentration, titratable acidity, length and severity of heat treatments and projected shelf life. Experiments were conducted to determine the optimal concentration of Hercules-JMJ pectin in the inventive beverage. Concentrations varied from 0.4–0.9 weight % of product or 11:1–5:1 protein to pectin weight ratios. The various levels of Hercules JMJ pectin were formulated into an adult beverage and viscosities were determined at 13 reciprocal seconds, using a Brookfield viscometer with a #1 spindle. The viscosity at 100 reciprocal seconds represents the shear during swallowing or mouthfeel. Table 4 sets forth the results of this experiment.

TABLE 4

| | JMJ Pectin Concentrations | | |
| --- | --- | --- | --- |
| Sample # | Pectin Level (weight %) | Viscosity (13 1/sec) | Viscosity (100 1/sec) |
| 5 | 0.6 | 10.6 | 7.9 |
| 6 | 0.75 | 20.7 | 15.2 |
| 7 | 0.8 | 9.8 | 12 |
| 8 | 0.9 | 22.1 | 17 |

An evaluation of this data indicates that JMJ pectin at a concentration of 0.8 weight % is optimal for the adult beverage of this invention. In an experiment using a child matrix of components, it was determined that a level of about 0.725 weight % is preferred.

EXAMPLE III

Stabilizer System

While pectin was shown in Example I to act as a protein stabilizer in low pH formulations, sediment still formed as the beverage contained high levels of protein and total solids. After about one month, the beverage of Example I with 0.6 weight % JMJ pectin, formed a sediment which attached to the bottom of the container and was very difficult to disperse. Analysis of sediment determined that it was composed of approximately 60% water, 5% fat, 20% protein with the remainder being carbohydrate (including pectin) and some minerals.

TABLE 3

| Sample # | Pectin Type (manufacturer-code) | Pectin Level (% by weight) | Sensory Comments* | Initial Viscosity (cps) |
| --- | --- | --- | --- | --- |
| 1 | Danisco RS400 | 0.75 | Skim milk-like thickness, chalky, drying | 34 |
| 2 | Danisco R5450 | 0.75 | Twice as thick as Sample #1, drying, chalky | 57 |
| 3 | Danisco AM491 | 0.94 | Creamy, drying, not as thick | 35 |
| 4 | Hercules JMJ | 0.6 | Cream, cool whip-like | 17 |

In this experiment, various stabilizers were used in conjunction with JMJ pectin at 0.6 weight % levels. Table 5 sets forth the system used in each Sample and resulting viscosities of the adult beverage at six (6) weeks of age.

TABLE 5

0.6 weight % JMJ Pectin Plus Others

| Sample # | Additional Stabilizer weight % (unless other stated) | Viscosity* 13 1/sec Carri-Med (cps) | Viscosity* 100 1/sec Carri-Med (cps) |
|---|---|---|---|
| 9 | Slendid 200 0.2% Avicel 1,000 ppm | 79 | 36.8 |
| 10 | Slendid 200 0.3% Avicel 1,000 ppm | 155 | 58.6 |
| 11 | Slendid 200 0.25% | 147 | 55.7 |
| 12 | Gellan Gum 75 ppm** Avicel 1,000 ppm | 86 | 36.5 |

*After six (6) weeks of storage at room temperature
**Gellan Gum is multi-functional polysaccharide produced by the microorganism *Pseadomonas elodea* and is distributed by the Merck & Co., Inc. of Whitehouse Station, N.J.; Kelco Division-USA.

At two and one half (2½) months, the experimental beverages evidenced no sediment on the container bottoms after a 2–3 second shake. One unique characteristic of these stabilizer systems is their thixotropic character wherein shear breaks down structure and the beverage becomes thinner. Samples 5–8 in Example II exhibited Newtonian behavior in that the viscosity was virtually the same regardless of shear rate. The data contained in Table 5 indicates that at low shear (13 reciprocal seconds) viscosities are high (i.e., 79–155 cps). In contrast, at 100 reciprocal seconds (shear rate of swallowing) the beverage is much thinner (i.e., 36–58 cps).

To evaluate the effect that this increased structure would have on consumer acceptability, a panel of fifty-three (53) professional tasters were asked to evaluate Samples 9 and 10, and compare them to three (3) commercially available products from the Ross Products Division of Abbott Laboratories, Columbus, Ohio; Ensures®, Ensure® Light and Ensure Plus®. The Ensure® product line provides complete, balanced nutrition in two (2) quarts (2000 calories in about 2 liters) and has a pH of about 6.8–7.1. Ensure Plus and Samples 9 and 10 were judged to have the same thickness, while Ensure and Ensure Light were significantly thinner. On thickness preference, all samples, except Ensure Light, were equally preferred. Ensure Light was significantly less preferred.

Additional beverages were made using only pectin as the stabilizer system, using the same methodology as the sample immediately above. The only change was that the pectin concentration was increased to 0.8% of JMJ pectin. The viscosity of theses samples were evaluated at the times indicated in Table 5B in the same manner as Tables 4 and 5. In addition to evaluating viscosity, physical stability was also evaluated. The following factors were reviewed:

(1) Bound and unbound sediment; and (2) Formation of whey layer (clear layer at top of container). The physical stability was evaluated at one month, three months, six months, nine months and ten months. After ten months, these samples did not have a sediment problem and would be acceptable for commercial sale. The following viscosity measures were obtained.

TABLE 5B

| 0.8% high-methoxy pectin, no additional Stabilizer | Viscosity Brookfield 13 1/sec, cps | Viscosity 13 1/sec Carri-Med, cps* | Viscosity 100 1/sec Carri-Med, cps** |
|---|---|---|---|
| 1 month | 44.6 | NT | NT |
| 3 months | 49.7 | NT | NT |
| 6 months | 47.7 | NT | NT |
| 9 months | 50.9 | NT | NT |
| 10 months | NT | 44 | 32 |

*Equivalent to Brookfield viscosity
*Equivalent to Swallowing Shear Rate

As demonstrated above, pectin alone in sufficient concentration can be used to stabilize low pH beverages.

EXAMPLE IV

Production of the Low pH Beverage According to the Invention—Adult Version

In this experiment, a 1,000 Kg batch of a peaches and cream flavored beverage according to the present invention was prepared using the bill of materials set forth in Table 6.

TABLE 6

Bill of Materials for PEACHES AND CREAM Flavored Low pH Beverage Yield 1,000 kg Batch

| INGREDIENT NAME | AMOUNT (Kg/1,000 kg) |
|---|---|
| Ingredient Water | ~780.1 |
| Sucrose | 79.88 |
| Maltodextrin (Lodex 15) | 44.95 |
| Milk Protein Isolate | 31.62 |
| Calcium Caseinate (Miprodan 505) | 16.56 |
| High Oleic Safflower Oil | 8.80 |
| Citric Acid | 6.64 |
| Pectin GENU JMJ 100 | 6.00 |
| Phosphoric Acid (75%) | 3.80 |
| Canola Oil | 3.77 |
| Potassium Citrate | 3.12 |
| Sodium Citrate | 2.34 |
| Magnesium Chloride | 2.32 |
| Tastemaker NA Peaches & Cream 356263 | 2.00 |
| Slendid L200 (pectin) | 2.0 |
| Avicel CL-611 | 1.0 |
| Magnesium Phosphate Dibasic | 0.85. |
| Ascorbic Acid | 0.75 |
| Potassium Benzoate | 0.6 |
| Choline Chloride | 0.53 |
| Soy Lecithin | 0.52 |
| UTMITM Premix* | 0.408 |
| Calcium Citrate | 0.36 |
| Calcium Glycerophosphate | 0.34 |
| Potassium Sorbate | 0.3 |
| Sodium Chloride | 0.21 |
| Oil Soluble Vitamin Premix | 0.1025 |
| Water Soluble Vitamin Premix | 0.07672 |
| Ascorbyl Palmitate | 0.01585 |
| FD&C Yellow #6 | 0.012 |
| L-Cysteine | 0.01125 |
| Vitamin A Palmitate | 0.00948 |
| Tenox GT-2 (Mixed Tocopherols) | 0.00264 |
| Folic Acid | 0.002346 |
| FD&C Red #40 | 0.002 |
| Potassium Iodide | 0.00023 |

*Ultratrace mineral and trace mineral premix

The manufacturing process used in this Example can be used, with minor modifications to make various embodiments of the present invention. The manufacturing process consisted of seven (7) steps which were as follows:

1. Preparation of the Oil Blend

The required amounts of high oleic safflower, canola oils and lecithin, and the emulsifier were blended and heated to 90–120° F. (30–49° C.). The vitamin A palmitate and the vitamin D, E, and K premix were then added. The mixed tocopherols and ascorbyl palmitate, which were used to prevent lipid oxidation at the low pH of the product, were also added. This oil blend was held under gentle agitation at about 35° C. until use.

2. Preparation of the Carbohydrate/Mineral Slurry

The carbohydrate/mineral slurry was made by adding potassium benzoate and potassium sorbate to water, heated to about 65–71° C. and agitating the solution until the preservatives were fully dissolved. The GENU JMJ and Slendid 200 were then directly dumped into the water and the mixture was agitated for about thirty (30) minutes to ensure proper hydration of the pectins. Top to bottom tank mixing is required to properly hydrate the pectins since they float until hydrated. Upon the hydration of the pectins, the following ingredients were, added: Avicel CL-611, sodium citrate, potassium-citrate, calcium glycerophosphate, calcium citrate, trace/ultratrace minerals premix, magnesium phosphate dibasic and potassium iodide. After sufficient agitation to properly disperse/dissolve the minerals, the maltodextrin and sucrose were then added. The carbohydrate/mineral slurry was held at 60–71° C. until used. The solid content of the slurry is approximately 35% by weight.

3. Protein Triblending

The calcium caseinate and milk protein isolate were triblended with water into the blend tank at 65–71° C.

4. Blending and Processing

The carbohydrate/mineral slurry and the oil blend were added to the blend tank and mixed vigorously. At this point, the pH of the mixture was about 6.6. The blend was then heated to about 68–80° C., deaerated, homogenized through a single stage homogenizer (900–1,100 psig), heated to about 79° C., homogenized through a two stage homogenizer at 4,000/500 psig, passed through a holding tube to assure a 73–85° C. heat treatment for about sixteen (16) seconds. The blend was then cooled to about 1.6–7° C. and held at that temperature until further use. The blend at this time had a pH of about 6.7.

5. Acidification

A mixture of citric acid and phosphoric acid, 70:30 weight %, was prepared and added to the batch so that a pH ranging from 4.0–4.35 was achieved.

6. Standardization

Additional dilution water was added to the batch and thereafter the peaches and cream flavor and coloring were added. A solution containing the water soluble vitamin premix and choline chloride was then added. Thereafter, an ascorbic acid solution containing ascorbic acid and L-cysteine, was added. Finally a folic acid solution was added to the batch.

7. Heat Process and Aseptic Filling

The final product blend was preheated to 36–65° C. and homogenized through a single stage homogenizer at 2,900–3,000 psig (20–20.7 MPa). The product was then heated to 102–104° C. and held there for seventeen (17) to eighteen (18) seconds. The final product blend was then cooled to 65–82° C. and passed through a remote homogenizer block at 1,100–1,500 psig (7.6–10.3 MPa) product. The product was finally cooled to about 21° C. and pumped the filler heads of the filling machine using aseptic processing technology.

The low pH beverage of the present invention is capable of providing refreshing fruit flavors in contrast to the old milkshake-type products. In addition to the peaches and cream flavor, flavors such as lemon cream, raspberry cream and pina colada were manufactured. A tasting panel found all products to be very acceptable with the peaches and cream and pina colada flavors most well received.

EXAMPLE V

Comparative

This experiment was conducted to evaluate the technology disclosed by Connolly in U.S. Pat. No. 5,409,725 which uses a reaction between protein and galactomannan to achieve protein stability in a low pH nutritional beverage.

Six (6) Samples were produced using a base formulation characterized in Table 7.

TABLE 7

Base Formulation for Comparatives Per 8 oz (231 ml) Serving

| COMPONENT | VALUE |
| --- | --- |
| Kcal | 145 |
| Carbohydrate, g | 25 |
| Protein, g | 9 |
| Fat, g | 1 |
| Kcal from Carbohydrate, % | 69 |
| Kcal from Protein, % | 25 |
| Kcal from Fat, % | 6 |
| Calcium, % RDI | 35–50 |
| Phosphorus, % RDI | 17.5–25 |
| Magnesium, % RDI | 43–63 |
| Vitamin D, % RDI | 30 |
| Vitamin C, % RDI | 100 |
| Vitamin B6, % RDI | 50 |
| Vitamin K, mcg | 330 |
| Folic Acid, %RDI | 50 |
| Zinc, % RDI | 35 |
| Copper, % RDI | 35 |
| Manganese (magnesium sulfate), mg | 2.5 |
| Sodium, mg | 100–200 |
| Boron, mg | 1–3 |

50% by weight of the protein was from calcium caseinate (Miprodan 505 from MD Foods of Denmark) and 50% by weight from milk protein isolate from Kerry Ingredients of Wisconsin. The carbohydrate was a 60:40 weight ratio of maltodextrin (Lodex 15) to sucrose. The source of calcium was a 50:50 weight ratio of calcium glycerophosphate and calcium citrate. The pH of the products were adjusted to a a 50:50 weight ratio blend of 25% citric and lactic acids.

The Samples varied in the type and amount of stabilizer system used as set forth in Table 8.

TABLE 8

Stabilizing Systems

| SAMPLE # | Variable + Supplier (concentration in weight %) |
| --- | --- |
| 13 | Control MaxPectin from Grinstead (0.006%) |
| 14 | Locust Bean Gum (LBG)/Guar Gum Blend CC427 from Contentinal Colloids (0.0035%) |

TABLE 8-continued

Stabilizing Systems

| SAMPLE # | Variable + Supplier (concentration in weight %) |
|---|---|
| 15 | Low Viscosity LBG SG 14 from AEP Colloids (0.035%) |
| 16 | Jaguar 11220 Function enhanced Guar Gum from Rhone Poulenc (0.0035%) |
| 17 | High Viscosity LBG 100 from Rhone Poulenc (0.0035%) |
| 18 | LBG SG-14 (0.0035%) and MaxPectin (0.0025%) |

In accordance with U.S. Pat. No. 5,409,725, protein stability is achieved by subjecting an aqueous suspension of protein and galactomannan to conditions sufficient to promote chemical reaction between the protein and the galactomannan, forming an aqueous glycoprotein. The galactomannans recommended in the '725 patent include Locust Bean Gum (LBG) and Guar Gum. In this experiment, low viscosity (<3,000 cps) and high viscosity (>3,000 cps) LBG were evaluated alone or in combination with guar gum or pectin. Guar gum was also tested as the sole stabilizer. Three (3) suppliers were used: AEP Colloids of Ballston Spa, N.Y.; Continental Colloids of West Chicago, Ill.; and Rhone Poulenc of Cranbary, N.J.

Experimental products were manufactured as follows: An oil blend containing 40% high oleic safflower oil, 40% canola oil and 20% corn oil was heated to 43–49° C. and the oil soluble vitamins and β-carotene were then-added. A carbohydrate slurry was prepared by combining water, maltodextrin, and sucrose and heating to 43–63° C. A protein/gum blend was made by dissolving the protein sources and gums in water and holding for twenty (20) minutes at 66° C. The three (3) slurries were then blended and process at their inherent pH (~6.2–6.7). Processing conditions were:

| Homogenization: | 3,900–4,100/500 psig |
|---|---|
| Temperature: | 74–77° C. |
| Time: | 16 seconds |

A mineral slurry containing calcium, magnesium, sodium, potassium and chloride sources was prepared and added. The pH was then lowered to 4.0–4.2 with citric and lactic acids. Water soluble vitamins and final water were added and the final blend was submitted to a final heat process under the following conditions:

| Homogenization: | 2,500/500 psig |
|---|---|
| Temperature: | 210° F. |
| Time: | 10 seconds |

Product was filled at temperature in glass bottles, capped, inverted and held for one (1) minute. After one minute, bottles were cooled in an ice water bath. In addition, several bottles were retort sterilized to determine if the stabilized proteins could survive a more severe heat treatment.

The teachings of U.S. Pat. No. 5,409,725 were followed during the manufacture of experimental Samples 13–18. To promote chemical reaction between the protein and the various gums, the patent recommends holding the aqueous blend at 45–87° C. for 5–90 minutes. The protein/gum blend in these experiments were held at 66° C. for 20 minutes. The protein to galactomannan ratio recommended in the patent ranges from 5:1–20:1. Ratios evaluated in this experiment were 5.3:1 for the pectin control and 9.1:1 for the guar gum and LBG variables. The patent claims the use of calcium sequestering agents such as EDTA, trisodium phosphate, trisodium citrate, disodium phosphate, sodium hexametaphosphate or an alkali metal salt of tripolyphosphate. In these experiments, no calcium sequestering agent was added as potassium citrate, sodium citrate and dipotassium phosphate were present as sources of major minerals in the product. In addition, the calcium salts used are calcium glycerophosphate and calcium citrate. Thus, there are considerable amounts of citrate and phosphate ions in the formula to sequester calcium. The acidifying agents used, citric and lactic acids, are also among the acids recommended in the patent. The pH range of the Samples were 4.0–4.2 which is within the range claimed in the patent (2.0–6.0).

At the neutral pH, all batches could be homogenized and heat processed. The highest back pressure was seen in Sample 18. This batch had both LBG and pectin at a 5.1:1 protein to gum ratio. During the second heat treatment, although the Samples containing LBG or guar gum made it though processing, upon cooling they become gelatinous-like and some of the protein curdled and precipitated out of solution. On the other hand, the product containing pectin (Sample 13) was smooth, non-gritty and low in viscosity.

Because of the high content of phosphoseryl residues, caseins bind polyvalent cations strongly, leading to charge neutralization, aggregation and eventually to precipitation. It is possible that the stabilization mechanism described in U.S. Pat. No. 5,409,725 is not effective in high protein and high mineral matrices such as the beverage of the present invention. Pectin stabilization appears to be an effective mechanism for the beverage of the present invention, even when submitted to retort sterilization Example VIII below, which uses terminal sterilization, supports this conclusion.

From this experiment, it was determined that the use of LBG and guar gum to stabilize intact proteins in the low pH beverage of the invention was not as effective as the use of pectin as the stabilizing agent. Samples containing the galactomannans did not survive processing or retort sterilization and curdled and phase separation occurred. In contrast, products containing pectin were smooth, non gritty and low in viscosity. Thus, there is no advantage in using the technology taught in U.S. Pat. No. 5,409,725 for products containing high levels of protein and polyvalent ions, specifically calcium and magnesium.

EXAMPLE VI

Production of the Low pH Beverage According to the Invention—Child Version

In this experiment, a 1,000 Kg batch of a beverage according to the invention, especially designed for children of 1 to 10 years of age was prepared using the bill of materials set forth in Table 9.

TABLE 9

Bil of Materials for Acidified Child's Beverage
Yield 1,000 Kg Batch

| INGREDIENT | AMOUNT (Kg/1,000 Kg) |
|---|---|
| Water | 804.92 |
| Sucrose | 70.790 |
| Hydrolyzed Corn Starch | 25.370 |
| Sodium Caseinate | 26.420 |
| High Oleic Safflower Oil | 23.480 |
| Soy Oil | 14.090 |

TABLE 9-continued

Bil of Materials for Acidified Child's Beverage
Yield 1,000 Kg Batch

| INGREDIENT | AMOUNT (Kg/1,000 Kg) |
|---|---|
| MCT Oil | 9.390 |
| Whey Protein Concentrate | 7.457 |
| Pectin | 7.250 |
| Micronized Tricalcium Phosphate | 2.700 |
| Citric Acid | 2.04 |
| Malic Acid | 2.04 |
| Phosphoric Acid | 2.04 |
| Magnesium Chloride | 1.765 |
| Potassium Citrate | 1.470 |
| Potassium Phosphate Dibasic | 0.994 |
| Potassium Benzoate | 0.600 |
| Soy Lecithin (Centrol CA) | 0.500 |
| Mono-Di Glycerides (Myverol) | 0.500 |
| Choline Chloride | 0.380 |
| Potassium Sorbate | 0.300 |
| Ascorbic Acid | 0.290 |
| m-Inositol | 0.100 |
| Trace Mineral Premix (including carrier) | 46.03 gms |
| Ferrous Sulfate | 20.4 gms |
| Zinc Sulfate | 16.8 gms |
| Manganese Sulfate | 1.47 gms |
| Copper Sulfate | 1.36 gms |
| Sodium Selenate | 36.13 mcg |
| Sodium Molybdate | 33.19 mcg |
| Taurine | 38.900 gms |
| Water Soluble Vitamin Premix (including carrier) | 35.850 gms |
| Niacinamide | 13.5 gms |
| d-Calcium Pantothionate | 8.7 gms |
| Thiamine Hydrochloride | 2.2 gms |
| Pyridoxine Hydrochloride | 2.1 gms |
| Riboflavin | 1.7 gms |
| Folic Acid | 301 mgs |
| Biotin | 262 mgs |
| Cyanocobalamin | 5.9 mgs |
| Oil Soluble Vitamin Premix (including carrier) | 22.270 gms |
| Vitamin D3 | 6.7 mgs |
| Vitamin E | 11.7 gms |
| Vitamin K | 21.5 mgs |
| L-Camitine | 9.340 gms |
| Ascorbyl Palmitate | 7.26 gms |
| VitaminA Palmitate | 991 mgs |
| Mixed Tpcopherols (tenox GT-2) | 1.4 gms |
| Potassium Iodide | 0.066 gms |

The manufacturing process described in Example IV was used to prepare the product.

EXAMPLE VII

Production of a Low pH Beverage with Juice—Child Version

In this experiment, a 1000 Kg batch of a beverage according to the invention which contained fruit juice was prepared using the bill of materials set forth in Table 10. The process for production was substantially identical to that used in Example IV except that the product was hot filled and not aseptically processed.

TABLE 10

Bill of Materials - Child Beverage with 20% Juice

| INGREDIENT | KG PER 1,000 KG |
|---|---|
| Water | 798.90 |
| Sucrose | 55.280 |
| Sodium Caseinate | 26.420 |
| Hydrolyzed Corn Starch | 25.470 |

TABLE 10-continued

Bill of Materials - Child Beverage with 20% Juice

| INGREDIENT | KG PER 1,000 KG |
|---|---|
| High Oleic Safflower Oil | 23.480 |
| Soy Oil | 14.090 |
| Apple Juice Concentrate (70.5 BRIX) | 11.2 |
| Pear Juice Concentrate (70.5 BRIX) | 11.2 |
| MCT Oil | 9.390 |
| Whey Protein Concentrate | 7.457 |
| Pectin | 7.250 |
| Citric Acid | 4.12 |
| Micronized Tricalcium Phosphate | 2.700 |
| Phosphoric Acid | 1.38 |
| Magnesium Chloride | 1.765 |
| Potassium Citrate | 1.072 |
| Potassium Phosphate Dibasic | 1.017 |
| Potassium Chloride | 0.901 |
| Potassium Benzoate | 0.600 |
| Soy Lecithin (Centrol CA) | 0.500 |
| Mono/Di Glycerides (Myverol) | 0.500 |
| Choline Chloride | 0.380 |
| Potassium Sorbate | 0.300 |
| Ascorbic Acid | 0.290 |
| m-Inositol | 0.100 |
| Trace Mineral Premix (including carrier) | 46.03 g |
| Ferrous Sulfate | 20.4 g |
| Zinc Sulfate | 16.8 g |
| Manganese Sulfate | 1.47 g |
| Copper Sulfate | 1.36 g |
| Sodium Selenate | 36.13 mcg |
| Sodium Molybdate | 33.19 mcg |
| Taurine | 38.90 g |
| Water Soluble Vitamin Premix | 35.85 g |
| Niaciamide | 13.50 g |
| d-Calcium Pantothenate | 8.7 g |
| Thiamine Hydrochloride | 2.2 g |
| Pyridoxine Hydrochloride | 2.1 g |
| Riboflavin | 1.7 g |
| Folic Acid | 30.1 mgs |
| Biotin | 262 mgs |
| Cyanocobalamin | 5.9 mgs |
| Oil Soluble Vitamin Premix | 22.7 g |
| Vitamin D3 | 6.7 mgs |
| Vitamin E | 11.7 g |
| Vitamin K | 21.5 mgs |
| L-Carnitine | 9.34 g |
| Ascorbyl Palmitate | 7.26 g |
| Vitamin APalmitate | 991 mgs |
| Potassium Iodide | 0.066 g |

EXAMPLE VIII

Production of Low pH Beverage for Child Version—Total Milk Protein

Two low pH beverages for children were prepared in this experiment. The bill of materials for both beverages was identical to that set forth in Table 8 (Example VI) except that the sodium caseinate and the whey protein was replaced with 32.15 kg of milk protein isolate which is also known as total milk protein. Two different sources of total milk protein were utilized; New Zealand Milk Products of Santa Rosa, Calif. and Kerry Ingredients of Beloit, Wis. The beverages were packaged in metal containers and subjected to terminal sterilization. After about one (1) week of storage at room temperature, the beverages were evaluated for protein stability, color, viscosity and flavor. When compared to the mixture of proteins in Example VI, (sodium caseinate and whey) the total milk protein from both suppliers was found to be superior in flavor and protein stability. The total milk protein also provided a lighter colored beverage. Thus, for the child version of this invention, the use of total milk protein is preferred.

An additional experiment was conducted wherein GENU® JM 150 was compared to GENU® JMJ at various concentrations in a child version of the present invention. Based on % sediment and particle size of protein, it was determined that GENU® JMJ at about 0.75% by weight produced the most satisfactory beverage.

EXAMPLE IX

Production of an Adult Beverage

In this experiment, a 1000 kilogram batch of an adult beverage having a caloric density of 1.5 kilocalorie (kcal) per ml is prepared using the procedure of Example IV. The product had the following composition. The calcium is provided by the protein sources. A single serving will provide at least 25% of RDI for calcium (per US standard).

TABLE 11

| Category | Ingredients | Amount (Kg) |
|---|---|---|
| Carbohydrates | Sucrose | 98.1 |
| | Liquid Corn Syrup | 81.7 |
| Proteins | Milk Protein Isolate or Yogurt Cultured Milk Protein Isolate | 43.2 |
| | Calcium Caseinate | 22.5 |
| Lipids | High Oleic Sunflower Oil | 23.7 |
| | Canola Oil | 11.4 |
| | Corn Oil | 8.68 |
| Emulsifier | Lecithin | 1.45 |
| | Magnesium Chloride | 3.47 |
| | Sodium Chloride | 0.22 |
| | Sodium Citrate | 3.82 |
| | Potassium Citrate | 4.52 |
| | Trace/Ultratrace Minerals Premix | 0.25 |
| | Potassium Iodide | 0.0002 |
| Vitamins | Oil Soluble Vitamins Premix | 0.1 |
| | Beta Carotene | 0.01 |
| | Ascorbic Acid | 0.45 |
| | Water Soluble Vitamins Premix | 0.1 |
| Conditional Nutrient | Choline Chloride | 0.6 |
| Stabilizers | Pectin | 8 |
| | Slendid 200 (pectin) | 1.5 |
| | Avicel CL-611 | 1 |
| Antioxidants | Mixed Tocopherols | 0.0009 |
| | Ascorbyl palmitate | 0.0544 |
| Processing Aids | Citric Acid | 0 |
| | Phosphoric Acid (85%) | 2.32 |

EXAMPLE X

Production of an Adult Beverage

In this experiment, a 1000 kg batch of an adult beverage having a caloric density of 1.5 kcal. is prepared using the procedure of Example IV. The product had the following composition. The calcium is provided by the protein sources. A single serving will provide at least 25% of the RDI for calcium (per US standard)

TABLE 12

| Category | Ingredients | Amount (Kg) |
|---|---|---|
| Carbohydrates | Sucrose | 97.5 |
| | Liquid Corn Syrup | 81.2 |
| Proteins | Milk Protein Isolate or Yogurt Cultured Milk Protein Isolate | 47 |
| | Calcium Caseinate | 12.3 |
| | Whey Protein Concentrate | 7.01 |
| Lipids | High Oleic Sunflower Oil | 23.7 |
| | Canola Oil | 11.4 |
| | Corn Oil | 8.68 |

TABLE 12-continued

| Category | Ingredients | Amount (Kg) |
|---|---|---|
| Emulsifier | Lecithin | 1.45 |
| Minerals | Tricalcium Phosphate | NAP |
| | Magnesium Chloride | 3.4 |
| | Sodium Chloride | 0.26 |
| | Sodium Citrate | 3.8 |
| | Potassium Citrate | 4.34 |
| | Trace/Ultratrace Minerals Premix | 0.25 |
| | Potassium Iodide | 0.0002 |
| Vitamins | Oil Soluble Vitamins Premix | 0.1 |
| | Beta Carotene | 0.01 |
| | Ascorbic Acid | 0.45 |
| | Water Soluble Vitamins Premix | 0.1 |
| Conditional Nutrient | Choline Chloride | 0.6 |
| Stabilizers | Pectin | 8 |
| | Slendid 200 (pectin) | 1.5 |
| | Avicel CL-611 | 1 |
| Antioxidants | Mixed Tocopherols | 0.0009 |
| | Ascorbyl palmitate | 0.0544 |
| Processing Aids | Citric Acid | 5.4 |
| | Phosphoric Acid (85%) | 2.32 |

EXAMPLE XI

Production of an Adult Beverage

In this experiment, a 1000 kg batch of an adult beverage having a caloric density of 1.5 kcal. is prepared using the procedure of Example IV. The product had the following composition. The calcium is provided by the protein sources. A single serving will provide at least 25% of the RDI for calcium (per US standard).

TABLE 13

| Category | Ingredients | Amount (Kg) |
|---|---|---|
| Carbohydrates | Sucrose | 97.4 |
| | Liquid Corn Syrup | 81.1 |
| Proteins | Milk Protein Isolate or Yogurt Cultured Milk Protein Isolate | 41.8 |
| | Calcium Caseinate | 11 |
| | Whey Protein Concentrate | 7.61 |
| | Hydrolysed Fish Gelatin | 6.5 |
| Lipids | High Oleic Sunflower Oil | 23.7 |
| | Canola Oil | 11.4 |
| | Corn Oil | 8.68 |
| Emulsifier | Lecithin | 1.45 |
| Minerals | Magnesium Chloride | 3.44 |
| | Sodium Chloride | 0.25 |
| | Sodium Citrate | 3.85 |
| | Potassium Citrate | 4.39 |
| | Trace/Ultratrace Minerals Premix | 0.25 |
| | Potassium Iodide | 0.0002 |
| Vitamins | Oil Soluble Vitamins Premix | 0.1 |
| | Beta Carotene | 0.01 |
| | Ascorbic Acid | 0.45 |
| | Water Soluble Vitamins Premix | 0.1 |

TABLE 13-continued

| Category | Ingredients | Amount (Kg) |
| --- | --- | --- |
| Conditional Nutrient | Choline Chloride | 0.6 |
| Stabilizers | Pectin | 8 |
|  | Slendid 200 (pectin) | 1.5 |
|  | Avicel CL-611 | 1 |
| Antioxidants | Mixed Tocopherols | 0.0009 |
|  | Ascorbyl palmitate | 0.0544 |
| Processing Aids | Citric Acid | 5.4 |
|  | Phosphoric Acid (85%) | 2.32 |

EXAMPLE XII

Production of an Adult Beverage

In this experiment, a 454 kilogram batch of an adult beverage is prepared using the procedure in Example IV.

TABLE 14

| Ingredient | Amount (in Kilograms) |
| --- | --- |
| Ingredient Water | 392.85 |
| Sucrose | 20.62 |
| Milk Protein Isolate | 8.86 |
| Calcium Caseinate | 4.6 |
| Maltodextrin | 7.25 |
| JMJ Pectin | 3.6 |
| Slendid Type-200 Pectin | 1.8 |
| Potassium Citrate | 1.79 |
| Magnesium Gluconate | 1.38 |
| High Oleic Safflower Oil | 1.37 |
| Calcium Citrate | 1.32 |
| Calcium Glycerophosphate | 1.26 |
| Sodium Citrate | 1.11 |
| Cellulose Gel | 0.9 |
| Magnesium Chloride | 0.62 |
| Ascorbic Acid | 0.17 |
| UTM/TM Premix | 0.16 |
| Canola Oil | 0.16 |

TABLE 14-continued

| Ingredient | Amount (in Kilograms) |
| --- | --- |
| Lecithin-Centrol CA | 0.05 |
| Vitamins $D_3$, E and $K_1$ Concentrate | 0.04 |
| Vitamin E (d, l- alpha-Tocopheryl Acetate) | 0.02 |
| Sodium Borate | 0.01 |
| Vitamin A Palmitate | 0.0036 |
| Pyridoxine Hydrochloride | 0.002 |
| Ascorbyl Palmitate | 0.002 |
| Folic Acid | 0.007 |
| Tenox GT-2 | 0.0003 |
| Cyanocobalamin | 0.00008 |
| Potassium Benzoate | 0.27 |
| Potassium Sorbate * | 0.135 |

EXAMPLE XIII

Comparative Example

This Example summarizes experiments that were carried out with an alternative calcium source, calcium citrate malate. Calcium citrate malate is used widely as a calcium source. It is available in a tablet form as a calcium supplement. It also has a history of being incorporated into acidic beverages. It is currently incorporated into Tropicana brands of orange juice. It was expected that calcium citrate malate would work in the beverages of this invention due to their acidic nature. This was not the case. As the data below demonstrates, the calcium citrate malate interacted with the protein resulting in gelling of the beverages.

Beverages having a composition comparable to that in Example XII were prepared. They were manufactured using procedures comparable to those of Example IV. The products were formulated to provide 50% of the USRDI for calcium in an 8 oz serving (0.2 wt. % elemental calcium). As noted below, a few beverages were prepared with only 25% of the RDI.

The calcium citrate malate (CCM) was prepared in the following manner. It was prepared by admixing calcium hydroxide (0.188 wt. %), citric acid (0.122%), and malic acid (0.212%) in water at room temperature. The CCM was then added to the beverage as described in Example IV prior to-acidification or after acidification as noted below. A control beverage having as a calcium source a 60:40 admixture of calcium glycerophosphate and calcium citrate. The following results were obtained:

TABLE 15

| Batch Code | Calcium Source | Ca Addition | Ca % RDI | Sucrose: Complex CHO | Viscosity 1 Week | Protein Stability (Grain) | Sour | Gel |
| --- | --- | --- | --- | --- | --- | --- | --- | --- |
| 1,005 | CaGly/CaCitr | Prior to | 50 | 65:35 | 16.4 | 4 | 1–1½ | — |
| 1,003 | CCM | Acid | 50 | 65:35 | 838 | 6 | 2 | 6 |
| 1,004 | CCM | After Acid | 50 | 65:35 | 88.6 | 6 | 2½ | 6 |

After the failures above, various experiments were conducted to try to add CCM to the formula. They included: order of addition, changes in carbohydrate and acid systems, protein level, stabilizer level and homogenization pressure. Products were evaluated for sensory characteristics and for physical stability with special attention to protein stability and viscosity.

The following results were obtained:

TABLE 16

Evaluation of - Acid and Carbohydrate Systems

| Batch Code | Calcium Source | Acid System | Ca % RDI | Sucrose:Complex CHO | Viscosity 1 Week | Protein Stability (Grain) | Sour | Gel |
|---|---|---|---|---|---|---|---|---|
| 2,001 | CaGly/CaCitrate | Citric/H3PO4 | 50 | 65:35 | 9.5 | 4 | 1½ | — |
| 2,003 | CCM | Citric/Malic | 50 | 65:35 | — | — | 2 | 3 Months |
| 2,004 | CCM | Citric/Malic/H3PO4 | 50 | 65:35 | — | — | 1½–2 | 3 Months |
| 2,005 | CaGly/CaCitrate | Citric/H3PO4 | 50 | 100:0 | — | — | 1½ | — |
| 2,006 | CCM | Citric/Malic | 50 | 100:0 | — | — | 2–2½ | 3 Months |
| 2,007 | CCM | Citric/Malic | 25 | 100:0 | — | — | 1½ | 3 Months Soft Gel |
| 2,101 | CaGly/CaCitrate | Citric/H3PO4 | 50 | 65:35 | 11 | 4 | 2 | — |
| 2,102 | CCM | Citric/Malic/H3PO4 | 50 | 65:35 | 46 | 4 | 2 | 6 Months |
| 2,103 | CCM | Citric/Malic/H3PO4 | 25 | 65:35 | 50.3 | 4 | 2 | 6 Months |
| 2,104 | CaGly/CaCitrate | Citric/H3PO4 | 50 | 80:20 | 11 | 4 | 1 | 6 |
| 2,105 | CaGly/CaCitrate 50% and CCM | Citric/Malic/H3PO4 | 50 | 65:35 | 37.8 | 4 | 1½ | 6 Months |
| 2,106 | CCM | Citric/Malic/H3PO4 | 50 | 80:20 | 43 | 4 | 1 | 6 Months |

TABLE 17

Evaluation of - Protein Level

| Batch Code | Calcium Source | Protein Level % | Ca % RDI | Sucrose:Complex CHO | Viscosity 1 Week | Protein Stability (Grain) | Sour | Gel |
|---|---|---|---|---|---|---|---|---|
| 2,201 | CaGly/CaCitrate | 3.71 | 50 | 80:20 | 9.5 | 4 | 1½ | — |
| 2,202 | CCM | 3.71 | 50 | | — | — | 2 | 3 Months |
| 2,203 | CCM | 2.5 | 50 | | — | — | 1½–2 | 3 Months |
| 2,204 | CCM | 2 | 50 | | — | — | 1½ | — |
| 2,205 | CCM | 1.5 | 50 | | — | — | 2–2½ | 3 Months |
| 2,206 | CCM | 3 | 50 | | — | — | 1½ | 3 Months |

TABLE 18

Evaluation of - Homogenization

| Batch Code | Calcium Source | Homo-genization | Ca % RDI | Sucrose:Complex CHO | Viscosity 1 Week | Protein Stability (Grain) | Sour | Gel |
|---|---|---|---|---|---|---|---|---|
| 3,801 | CaGly/CaCitrate | single | 50 | 75:25 | 40 | 4 | 3 | — |
| 3,802 | CaGly/CaCitrate | double | 50 | | 60.8 | 5 | 1½ | — |
| 3,803 | CCM | single | 50 | | 63 | 5 | 2 | 3 Months |
| 3,804 | CaGly/CaCitrate | single | 50 | | 26.7 | 6 | 2½ | — |
| 3,805 | CCM | single | 50 | | 36.3 | 6 | 2 | 3 Months |

TABLE 19

Evaluation of - Stabilizer

| Batch Code | Calcium Source | Stabilizar % | Ca % RDI | Sucrose: Complex CHO | Viscosity 1 Week | Protein Stability (Grain) | Sour | Gel |
|---|---|---|---|---|---|---|---|---|
| 3,701 | CaGly/ CaCitrate | 0.8 | 50 | 75:25 | 54.3 | 5 | 1½ | — |
| 3702 | CCM | | | | 381 | 5 | 1½ | 3 months |
| 3,703 | CaGly/ CaCitrate | 1 | | | 65.5 | 6 | 1½ | — |
| 3,704 | CCM | | | | 119.4 | 6 | 1½ | 3 months |

Discussion

The addition of CCM before or after acidification was evaluated and results are presented in Table 15 Addition of CCM before acidification was easier and the final product was less sour and less chalky. Sour and chalky mouthfeel were higher in the CCM samples than in the control. In addition, the CCM variables had a higher grain, higher viscosity and gelled after 3 to 6 months of shelf life. The control calcium system is not as soluble as CCM at the product pH of 4.0 to 4.35. It appears that the more soluble calcium from CCM binds with the protein in the formula causing conformational changes and reduced charge. The reduced protein charge permits protein aggregation and gel formation. The initial high grain and viscosity values and the chalky mouthfeel were early indications of protein instability. After few months gelling occurred.

A second set of experiments was designed to try to reduce the sour note in the CCM variables. This was done by increasing the amount of sucrose in the products and by using, in addition to citric and malic acids required in the CCM preparation, phosphoric acid. Results are presented in Table 16. In general, it appears that the use of phosphoric acid reduced the sour note. Since phosphoric acid is a strong acid and it is not very sour, the final product is perceived as less sour. The higher level of sucrose also helped with the sour. All samples with CCM, were chalkier than the control and had higher viscosity. They gelled after 3 to 6 months of storage. A couple of samples were made to deliver 25% RDI for calcium (batch 2007, batch 2103). These samples also gelled, but the gel was described as soft and weak. In addition, one batch was made with a combination of the control calcium salts and CCM (batch 2105). It also gelled in time.

Since the gelling was probably caused by the protein and calcium interaction, the next set of experiments was designed to determine the effect of protein level on gelling. Samples were prepared containing protein ranging from 1.5 to 3.71%. Results presented in Table 19 indicate that in all cases, the samples containing CCM gelled while the control remained unchanged. In most cases, the chalky mouthfeel decreased as the protein content decreased.

Other experiments described in Tables 17 and 18 also demonstrated that CCM caused gelling in the formula.

Industrial Applicability

Some individuals in need of nutritional supplementation simply do not like or cannot tolerate milky supplements. These individuals may also suffer from taste fatigue which can hinder compliance. This invention will offer individuals a new variety of supplements that will improve intake and thereby improve nutritional status. This invention is primarily directed to a low pH beverage that contains high levels of protein and nutrients which is stabilized through the use of HM pectin alone, or in combination with other stabilizers such as CMC and MCC.

In accordance with the foregoing disclosure, it will be within the ability of one skilled in the relevant arts to make modifications to the present invention, such as through the substitution of equivalent materials and/or their amounts, without departing from the spirit of the invention as reflected in the appended claims.

We claim:

1. A shelf stable liquid enteral formula having a pH of from about 3.0–4.6 comprising:

(a) from about 45–95% by weight water;

(b) from about 1.0–15% by weight of caseinate (c) from 0.5–3.3% by weight of high methoxy pectin;

(d) from about 1–30% by weight of a carbohydrate;

(e) from about 0.5–10% by weight of an edible oil;

(f) sufficient quantities of protein, carbohydrate, and edible oil to serve as a sole source of nutrition, in a volume ranging from 1000–2000 ml, (g) at least 100% of the adult RDI for vitamins and minerals, in a volume ranging from 1000–2000 ml, and;

(h) and said enteral formula has a shelf life of at least one year.

2. The enteral formula according to claim 1 in which said edible oil is selected from the group consisting of soy oil, marine oil, canola oil, high oleic safflower oil, high oleic sunflower oil, fractionated coconut oil, olive oil, borage, black currant seed oil, corn, fungal oils, safflower, sunflower, evening primrose, cottonseed, rice bran, grape seed, flaxseed, garlic, peanuts, almonds, walnuts, wheat germ, egg, and sesame.

3. The enteral formula according to claim 1 in which said carbohydrate is selected from the group consisting of dextrose, lactose, fructose, sucrose, maltose, corn starch, hydrolysed corn starch, maltodextrin, glucose polymers, corn syrup solids, oligosaccharides, high saccharides, high fructose corn syrup, and fructooligosaccharides.

4. The enteral formula according to claim 1 wherein said pH is from about 4.0 to about 4.35.

5. The enteral formula according to claim 1 wherein said edible oil is present at a concentration of from about 4.0–6.0% by weight.

6. The enteral formula according to claim 1 wherein said edible oil is selected from the group consisting of high oleic safflower oil, canola oil, soy oil and fractionated coconut oil.

7. The enteral formula according to claim 1 which contains from about 0.1–10% by weight of an acid system comprising at least one food grade acid selected from the group comprising citric acid, phosphoric acid, tartaric acid, lactic acid, malic acid, glucono delta lactone and mixtures thereof.

8. The enteral formula according to claim 1 in which said caseinate is selected from the group consisting of calcium caseinate and sodium caseinate.

9. The enteral formula according to claim 1 in which said caseinate is provided by milk protein isolate.

* * * * *